US009055303B2

(12) United States Patent
Bandoh et al.

(10) Patent No.: US 9,055,303 B2
(45) Date of Patent: Jun. 9, 2015

(54) VIDEO ENCODING METHOD AND DECODING METHOD, APPARATUSES THEREFOR, PROGRAMS THEREFOR, AND STORAGE MEDIA FOR RECORDING THE PROGRAMS

(75) Inventors: Yukihiro Bandoh, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1208 days.

(21) Appl. No.: 12/444,135

(22) PCT Filed: Oct. 5, 2007

(86) PCT No.: PCT/JP2007/069570
§ 371 (c)(1),
(2), (4) Date: Apr. 2, 2009

(87) PCT Pub. No.: WO2008/044637
PCT Pub. Date: Apr. 17, 2008

(65) Prior Publication Data
US 2010/0067579 A1    Mar. 18, 2010

(30) Foreign Application Priority Data

Oct. 10, 2006  (JP) ................................. 2006-276074

(51) Int. Cl.
*H04N 7/12*      (2006.01)
*H04N 11/02*     (2006.01)
(Continued)

(52) U.S. Cl.
CPC ............. *H04N 19/59* (2014.11); *H04N 19/172* (2014.11); *H04N 19/61* (2014.11); *H04N 19/117* (2014.11);
(Continued)

(58) Field of Classification Search
CPC .. H04N 19/117; H04N 19/136; H04N 19/154

USPC ........................................ 375/240.01–240.29
See application file for complete search history.

(56) References Cited

U.S. PATENT DOCUMENTS 5,377,266 A  12/1994  Katta et al.
5,412,428 A  5/1995  Tahara
(Continued)

FOREIGN PATENT DOCUMENTS

EP       582122 A1    2/1994
EP     1 551 184 A2   7/2005
(Continued)

OTHER PUBLICATIONS

Sugita, Hiroshi, Taguchi, Akira; "Chrominance Signal Interpolation of YUV4:2:0 Format Color Images", IEICE (the Institute of Electronics, Information and Communication Engineers) Transactions, vol. J88-A, No. 6, pp. 751-760, 2005.
(Continued)

*Primary Examiner* — Nhon Diep
(74) *Attorney, Agent, or Firm* — Harness, Dickey & Pierce, P.L.C.

(57) ABSTRACT

A video encoding method, in which a video signal consisting of two or more signal elements is targeted to be encoded, includes a step of setting a downsampling ratio is set for a specific signal element in a frame, in accordance with the characteristics in the frame; and a step of generating a target video signal to be encoded, by subjecting the specific signal element in the frame to downsampling in accordance with the set downsampling ratio. The frame may be divided into partial areas in accordance with localized characteristics in the frame; and a downsampling ratio for a specific signal element in these partial areas may be set in accordance with the characteristics in each partial area.

22 Claims, 16 Drawing Sheets

(51) Int. Cl.
*H04N 11/04* (2006.01)
*H04N 19/59* (2014.01)
*H04N 19/172* (2014.01)
*H04N 19/61* (2014.01)
*H04N 19/117* (2014.01)
*H04N 19/136* (2014.01)
*H04N 19/186* (2014.01)
*H04N 19/154* (2014.01)
*H04N 19/17* (2014.01)

(52) U.S. Cl.
CPC .......... *H04N 19/136* (2014.11); *H04N 19/186* (2014.11); *H04N 19/154* (2014.11); *H04N 19/17* (2014.11)

(56) References Cited

U.S. PATENT DOCUMENTS

| | | | |
|---|---|---|---|
| 5,500,685 | A | 3/1996 | Kokaram |
| 5,748,242 | A * | 5/1998 | Podilchuk ................ 348/391.1 |
| 6,081,622 | A | 6/2000 | Carr et al. |
| 6,118,730 | A * | 9/2000 | Kubo et al. ............. 365/233.12 |
| 6,175,592 | B1 | 1/2001 | Kim et al. |
| 6,188,730 | B1 | 2/2001 | Ngai et al. |
| 7,054,494 | B2 | 5/2006 | Lin et al. |
| 7,463,775 | B1 * | 12/2008 | Sites ............................ 382/232 |
| 2002/0114528 | A1 | 8/2002 | Tanaka et al. |
| 2002/0126752 | A1 | 9/2002 | Kim |
| 2002/0170063 | A1 * | 11/2002 | Ansari et al. .................... 725/95 |
| 2003/0043921 | A1 * | 3/2003 | Dufour et al. ............ 375/240.25 |
| 2004/0062307 | A1 | 4/2004 | Hallapuro et al. |
| 2004/0076333 | A1 | 4/2004 | Zhang et al. |
| 2005/0013498 | A1 * | 1/2005 | Srinivasan et al. ............ 382/239 |
| 2005/0053294 | A1 | 3/2005 | Mukerjee et al. |
| 2005/0141617 | A1 | 6/2005 | Kim et al. |
| 2006/0222080 | A1 | 10/2006 | Wang |
| 2006/0233447 | A1 | 10/2006 | Matsubara |

FOREIGN PATENT DOCUMENTS

| | | |
|---|---|---|
| JP | 6-303608 A | 10/1994 |
| JP | 2000-181438 A | 6/2000 |
| JP | 2003-274190 A | 9/2003 |
| JP | 2003-274193 A | 9/2003 |
| JP | 2006-197144 A | 7/2006 |
| RU | 2 146 854 C1 | 3/2000 |
| RU | 2005 107 478 A | 7/2006 |
| SU | 1581230 A3 | 7/1990 |
| TW | 392131 | 6/2000 |
| TW | I237494 | 8/2005 |
| WO | 99/55013 A2 | 10/1999 |
| WO | 03/058945 A2 | 7/2003 |
| WO | 2005/093661 A2 | 10/2005 |

OTHER PUBLICATIONS

Miura, Takashi, Itagaki, Fumihiko, Yokoyama, Akihiko, Yamaguchi, Momoe; "A Color Image Compression Scheme Based on the Adaptive Orthogonalized Transform—Accelerated by Sorted Dictionary", IEICE (The Institute of Electronics, Information and Communication Engineers) Transactions, vol. J85-D2, No. 11, pp. 1672-1682, Nov. 2002.

Ying, Chen, et al., "New 4:2:0 chroma sample format for phase difference eliminating and color space scalability," Joint Video Team (JVT) of ISO/IEC MPEG & ITU-T VCEG, JVT-O078, 15th Meeting: Busan, Korea, Apr. 16-22, 2005.

McMahon, Tom, et al., Draft Prof. Ext Amendment, Joint Video Team (JVT) of ISO/IEC MPEG & ITU-T VCEG, JVT-H037r0, 8th Meeting: Geneva, Switzerland, May 23-27, 2003.

Bandoh, Yukihiro, et al., "Separation of luma-component and chroma-components," Joint Video Team (JVT) of ISO/IEC MPEG & ITU-T VCEG, doc. JVT-U119, 21st Meeting: Hangzhou, China, Oct. 20-27, 2006.

Shen, Jiandong, et al., "Benefits of Adaptive Motion Accuracy in H.26L Video Coding," Proceedings of 2000 International Conference on Image Processing, Sep. 10-13, 2000, pp. 1012-1015.

Wiegand, Thomas, et al., "Overview of the H.264/AVC Video Coding Standard," IEEE Transactions on Circuits and Systems for Video Technology, vol. 13, No. 7, Jul. 2003, pp. 560-576.

Office Action, European Patent Application No. 12 152 580.2, Jul. 17, 2013.

Sugita, Hiroshi, et al., "Chrominance Signal Interpolation of YUV4:2:0 Format Color Images," IEICE Transactions, vol. J88-A, No. 6, pp. 751-760, Jun. 2005 (English translation).

Miura, Takashi, et al., "A Color Image Compression Scheme Based on the Adaptive Orthogonalized Transform—Accelerated by Sorted Dictionary," IEICE Transactions, vol. J85-D2, No. 11, pp. 1672-1682, Nov. 2002 (English translation).

Sullivan, Gary J., et al., "The H.264/AVC Advanced Video Coding Standard: Overview and Introduction to the Fidelity Range Extensions," presented at the SPIE Conference on Applications of Digital Image Processing XXVII, pp. 1-22, Aug. 2004.

Office Action, European Patent Application No. 07 829 308.1, Feb. 17, 2015.

Office Action, European Patent Application No. 12 152 586.9, Feb. 17, 2015.

Office Action, European Patent Application No. 12 152 580.2, Feb. 17, 2015.

* cited by examiner

FIG. 7A 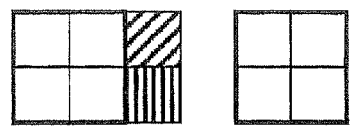 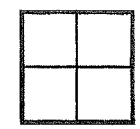
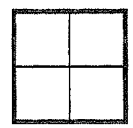 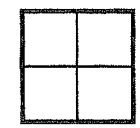
FIG. 7B 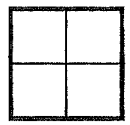 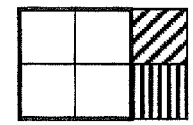
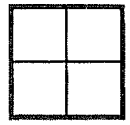 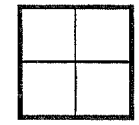
FIG. 7C 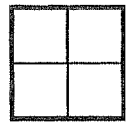 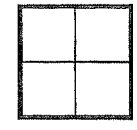
 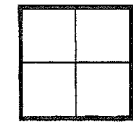
FIG. 7D 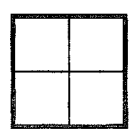 
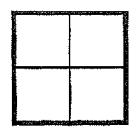 

FIG. 8

MOTION ESTIMATION ACCURACY AND INTERPOLATION ACCURACY REQUIRED IN A CHROMINANCE ELEMENT
(WHEN MOTION ESTIMATION ACCURACY OF A LUMINANCE ELEMENT IS TAKEN AS 1/4 PIXEL ACCURACY)

| r [t−1] | r [t] | r [t−1] / r [t] | MOTION ESTIMATION ACCURACY REQUIRED IN FRAME TARGETED FOR ENCODING | INTERPOLATION ACCURACY REQUIRED IN REFERENCE FRAME |
|---|---|---|---|---|
| 1 | 1 | 1 | 1/4 | 1/4 (TWICE) |
| 1 | 1/2 | 2 | 1/2 | 1/2 (ONCE) |
| 1 | 1/4 | 4 | 1 | 1 (NONE) |
| 1/2 | 1 | 1/2 | 1/4 | 1/8 (THREE TIMES) |
| 1/2 | 1/2 | 1 | 1/2 | 1/4 (TWICE) |
| 1/2 | 1/4 | 2 | 1 | 1/2 (ONCE) |
| 1/4 | 1 | 1/4 | 1/4 | 1/16 (FOUR TIMES) |
| 1/4 | 1/2 | 1/2 | 1/2 | 1/8 (THREE TIMES) |
| 1/4 | 1/4 | 1 | 1 | 1/4 (TWICE) |

VIDEO ENCODING METHOD AND DECODING METHOD, APPARATUSES THEREFOR, PROGRAMS THEREFOR, AND STORAGE MEDIA FOR RECORDING THE PROGRAMS

TECHNICAL FIELD

The present invention relates to a video encoding method in which a video signal consisting of two or more signal elements is targeted to be encoded and to an apparatus for the same, and also to a video decoding method for decoding encoded data generated in accordance with this video encoding method and to an apparatus for the same, and also to a video encoding program which is used to realize the video encoding method and to a computer-readable recording medium on which this program is recorded, and also to a video decoding program which is used to realize the video decoding method and to a computer-readable recording medium on which this program is recorded.

Priority is claimed on Japanese Patent Application No. 2006-276074, filed Oct. 10, 2006, the contents of which are incorporated herein by reference.

BACKGROUND ART

In standard encoding schemes for moving pictures starting with H.264/AVC, chrominance elements in input video which have been downsampled when compared to the luminance elements (namely, which have been sampled at a lower frequency than the frequency at which the luminance elements were sampled) are used. This corresponds to video formats known as 4:2:2, 4:2:0, and 4:1:1 formats.

Video formats in which these chrominance elements are resampled are based on the physiological finding that visual sensitivity is less sensitive towards chrominance elements than towards luminance elements, and have been introduced with the aims of reducing the amount of video information and lowering the cost of imaging devices (see, for example, Non-patent documents 1 and 2).

On the other hand, because of increased expectations for further improvements in video image quality, 4:4:4 format video in which chrominance signals are not resampled is attracting attention. For example, in the JVT (Joint Video Team), development for a new profile for H.264 (advanced 4:4:4 profile) is underway.

Non-patent document 1: "Chrominance Signal Interpolation of YUV4:2:0 Format Color Images", Hiroshi Sugita, Akira Taguchi, IEICE (The Institute of Electronics, Information and Communication Engineers) Transactions, Vol. J88-A, No. 6, pp. 751-760, 2005

Non-patent document 2: "A Color Image Compression Scheme Based on the Adaptive Orthogonalized Transform - Accelerated by Sorted Dictionary", Takashi Miura, Fumihiko Itagaki, Akihiko Yokoyama, Momoe Yamaguchi, IEICE (The Institute of Electronics, Information and Communication Engineers) Transactions, Vol. J85-D2, No. 11, pp. 1672-1682, November 2002

DISCLOSURE OF INVENTION

Problems to be Solved by the Invention

Downsampling chrominance elements is an effective means of reducing the amount of code while suppressing any decrease in subjective image quality. However, depending on the image content, in some cases further downsampling is possible without this leading to deterioration in subjective image quality. In contrast, depending on the image content, in some cases the high image quality of a 4:4:4 format video is not achieved due to the chrominance elements in a frame all being downsampled uniformly.

The characteristics of an image signal changes for each frame, and there are also localized changes within a frame. Visual sensitivity towards chrominance elements also changes in accordance with these changes. For example, in a frame (or in an area) having a small (i.e., a dark) pixel value, there is lowered visual sensitivity towards chrominance elements compared with a frame (or an area) having a large (i.e., a bright) pixel value.

Because of this, by changing the downsampling ratio of chrominance elements in accordance with the characteristics of each frame, or in accordance with the localized characteristics within a frame, it may be possible to efficiently reduce the amount of code while maintaining the subjective image quality.

However, conventional downsampling of chrominance elements is performed at a uniform ratio over the entire frame, so that there is considerable scope for improvement in encoding efficiency.

The present invention was conceived in view of the above described circumstances, and it is an object thereof to establish novel video encoding and decoding technology which efficiently reduces code amounts by introducing adaptive downsampling processing for each frame and introducing adaptive downsampling processing for each area within each frame.

Means for Solving the Problem

[1] Video Encoding Apparatus of the Present Invention which Adaptively Changes a Downsampling Ratio
[1-1] Structure for Making Adaptive Changes in Units of Frames In order to achieve the above described object, the video encoding apparatus of the present invention is structured such that, when a video signal made up of two or more signal elements is targeted for encoding, the video encoding apparatus is provided with: (1) a setting device which sets a downsampling ratio for a specific signal element of a frame in accordance with the characteristics inside the frame; and (2) a generating device which generates a video signal which is targeted to input to an encoder by downsampling a specific signal element inside a frame in accordance with the downsampling ratio set by the setting device.

Here, the video encoding method of the present invention which is realized by the respective processing devices described above being operated can also be realized by means of a computer program. This computer program may be supplied by being recorded on a suitable computer-readable recording medium, or may be supplied via a network. When the present invention is to be implemented, the computer program is installed, and is then able to realize the present invention by being operated by a control device such as a CPU.

In view of the observation that, for example, when a comparison is made between a frame in which there is a large amount of transition and a frame in which there is a small amount of transition, there is a relatively low level of visual sensitivity in the former, and thus, compared with a frame having a small amount of transition, there is no reduction in subjective image quality in a frame having a large amount of transition even if large-scale downsampling is performed, in the video encoding apparatus of the present invention which is structured in the manner described above, a video signal targeted for input into an encoder is generated, for example, by setting a downsampling ratio for a specific signal element such as a chrominance signal in each frame in accordance with the size of the amount of transition within the frame, and then downsampling the specific signal element in units of frames in accordance with the set downsampling ratio.

In accordance with this structure, according to the video encoding apparatus of the present invention, it is possible to efficiently reduce code amounts while maintaining subjective image quality.

[1-2] Structure for Making Adaptive Changes in Units of Partial Areas Within a Frame In the above described video encoding apparatus, it is also possible for the device which sets the downsampling ratio to have: a device which divides a frame into partial areas in accordance with localized characteristics within the frame; and a device which sets downsampling ratios for specific signal elements in the partial areas in accordance with the characteristics in each partial area, and for the video signal targeted for encoding to be generated by downsampling the specific signal element of the partial area in accordance with the set downsampling ratio.

In view of the observation that, for example, when a comparison is made between a partial area in which there is a large amount of transition and a partial area in which there is a small amount of transition, there is a relatively low level of visual sensitivity in the former, and thus, compared with a partial area having a small amount of transition, there is no reduction in subjective image quality in a partial area having a large amount of transition even if large-scale downsampling is performed, in the video encoding apparatus which is structured in such a manner, a video signal targeted for input into an encoder is generated, for example, by setting a downsampling ratio for a specific signal element such as a chrominance signal in each partial area within a frame in accordance with the size of the transition amount within the partial area in the frame, and then downsampling the specific signal element in units of partial areas within the frames in accordance with the set downsampling ratio.

In the case of this structure as well, it is possible to efficiently reduce code amounts while maintaining subjective image quality.

Video encoding apparatus and video decoding apparatus of the present invention which handle changes in an encoded block pattern generated as a result of the downsampling ratio being adaptively changed The video encoding apparatus of the present invention has a basic structure in which, when a video signal made up of two or more signal elements is taken as a target for encoding, video signals generated by downsampling specific signal elements in accordance with a downsampling ratio set for each frame or set for each partial area within a frame are encoded.

In contrast, in a standard video encoding apparatus, a structure may be employed in which, for each quantized signal element obtained by encoding, information is appended to each block of a specific size showing whether or not a significant coefficient is contained in that block. If this type of structure is employed, for blocks which contain no significant coefficient, it is possible to omit the appending of a transformation coefficient thereby enabling a reduction in the amount of code to be achieved.

However, in the video encoding apparatus of the present invention, because the downsampling ratio of a specific signal element is changed adaptively, the pattern formed by combining blocks for each signal element does not become a fixed pattern.

Therefore, the present invention may further be provided with a device which, for each quantized signal element obtained by encoding the video signal targeted for encoding, when appending information to each block of a specific size showing whether or not a significant coefficient is contained in that block, appends information showing at which position a group of blocks which share the specific signal element is located, to the group of blocks.

In addition, the present invention is a video decoding apparatus which decodes encoded data of a video signal which has been generated by this video encoding apparatus, wherein there are provided: a device which, by decoding encoded data of the information showing at which position the group of blocks which share the specific signal element is located, determines whether or not the group of blocks targeted for decoding is a group of blocks which share the specific signal element; and a device which, for the group of blocks which the determination device has determined to be a group of blocks which share the specific signal element, by decoding encoded data of the specific signal element shared by the group of blocks, decodes the downsampled signal element in accordance with the downsampling ratio set on the encoding side.

Here, the video encoding method of the present invention and the video decoding method of the present invention which are realized by the respective processing devices described above being operated can also be realized by means of a computer program. This computer program may be supplied by being recorded on a suitable computer-readable recording medium, or may be supplied via a network. When the present invention is to be implemented, the computer program is installed, and is then able to realize the present invention by being operated by a control device such as a CPU.

In the video decoding apparatus of the present invention which is structured in this manner, information showing at which position the group of blocks which share the specific signal element is located is appended to the group of blocks.

In addition, the present invention is a video decoding apparatus which decodes encoded data of a video signal which has been generated by this video encoding apparatus, wherein there are provided: a device which, by decoding encoded data of information showing at which position the group of blocks which share the specific signal element is located, determines whether or not the group of blocks targeted for decoding is a group of blocks which share the specific signal element; and a device which, for a group of blocks which the determination device has determined to be a group of blocks which share the specific signal element, by decoding encoded data of the specific signal element shared by the group of blocks, decodes the downsampled signal element in accordance with the downsampling ratio set on the encoding side.

In accordance with this structure, according to the present invention, when a structure is employed in which a downsampling ratio is changed adaptively with frames or slices within frames being taken as units, even if the combination pattern of the blocks changes for each signal element in accordance with this structure, it is possible for a structure which is used in a standard video encoding apparatus which appends to blocks having a certain size information showing whether or not a quantized signal contains a significant coefficient to be used without this structure being changed.

[3] Video encoding apparatus and video decoding apparatus of the present invention which handle changes in the interpolation accuracy of a reference frame which are generated as a result of the downsampling ratio being adaptively changed.

[3-1] When a Downsampling Ratio is Changed Adaptively in Units of Frames

The video encoding apparatus of the present invention has a basic structure in which, when a video signal made up of two or more signal elements is taken as a target for encoding, video signals generated by downsampling specific signal elements in accordance with a downsampling ratio set for each frame are encoded.

In contrast, in a video encoding apparatus, motion compensation having a decimal fraction pixel accuracy may be used for an inter-frame prediction. This is because highly accurate motion compensation can be realized if this type of structure is employed.

However, in the video encoding apparatus of the present invention, because the downsampling ratio of a specific signal element is changed adaptively in units of frames, the interpolation accuracy of a reference frame which is required when motion compensation having a decimal fraction pixel accuracy is used for an inter-frame prediction does not become fixed.

Therefore, the above described video encoding apparatus of the present invention may further be provided with: a device which, when motion compensation having a decimal-fraction pixel accuracy is used for an inter-frame prediction in the encoding of the video signal targeted for encoding, changes the interpolation accuracy of a downsampled signal element in the reference frame in accordance with a ratio between the downsampling ratio of the frame targeted for encoding and the downsampling ratio of the reference frame; and a device which, based on the changed interpolation accuracy, generates an interpolated image of the reference frame.

As a counterpart thereto, the present invention provides a video decoding apparatus which decodes encoded data of a video signal which has been generated by the above described video encoding apparatus, and which is provided with: a device which, when motion compensation having a decimal-fraction pixel accuracy is used for an inter-frame prediction, changes the interpolation accuracy of a downsampled signal element in the reference frame in accordance with a ratio between the downsampling ratio of the frame targeted for decoding and the downsampling ratio of the reference frame; and a device which, based on the changed interpolation accuracy, generates an interpolated image of the reference frame.

Here, the video encoding method of the present invention and the video decoding method of the present invention which are realized by the respective processing devices described above being operated can also be realized by means of a computer program. This computer program may be supplied by being recorded on a suitable computer-readable recording medium, or may be supplied via a network. When the present invention is to be implemented, the computer program is installed, and is then able to realize the present invention by being operated by a control device such as a CPU.

In the video encoding apparatus of the present invention which is structured in this manner, the interpolation accuracy of a downsampled signal element in a reference frame is changed in accordance with a ratio between the downsampling ratio of a frame targeted for encoding and the downsampling ratio of the reference frame, and an interpolated image of the reference frame is generated based on the changed interpolation accuracy.

Moreover, in the video decoding apparatus of the present invention which is structured so as to correspond to this, the interpolation accuracy of a downsampled signal element in a reference frame is changed in accordance with a ratio between the downsampling ratio of a frame targeted for decoding and the downsampling ratio of the reference frame, and an interpolated image of the reference frame is generated based on this changed interpolation accuracy.

In accordance with this structure, according to the present invention, when a structure is employed in which a downsampling ratio is changed adaptively in units of frames, even if the interpolation accuracy of the reference frame changes in accordance with this structure, it is possible to generate an interpolated image of a reference frame which realizes the required motion compensation.

[3-2] When a Down Sampling Ratio is Changed Adaptively in Units of Partial Areas Within a Frame The video encoding apparatus of the present invention is also able to encode video signals generated by downsampling specific signal elements more finely in accordance with a downsampling ratio set for each partial area within a frame.

As stated above, in a video encoding apparatus, motion compensation having a decimal fraction pixel accuracy may be used for an inter-frame prediction. This is because highly accurate motion compensation can be realized if this type of structure is employed.

However, in the video encoding apparatus of the present invention, because the downsampling ratio of a specific signal element is changed adaptively in units of partial areas within the frames, the interpolation accuracy of a reference frame which is required when motion compensation having a decimal fraction pixel accuracy is used for an inter-frame prediction does not become fixed.

Therefore, the above described video encoding apparatus may further be provided with: a device which, when motion compensation having a decimal fraction pixel accuracy is used for an inter-frame prediction in the encoding of the video signal targeted for encoding, changes the interpolation accuracy of a downsampled signal element in a partial area within the reference frame in accordance with a ratio between the downsampling ratio of each partial area within the frame targeted for encoding and the downsampling ratio of the partial area within the reference frame which is referred to when this partial area undergoes motion compensation; and a device which, based on the changed interpolation accuracy, generates an interpolated image of the partial area within the reference frame.

As a counterpart thereto, the present invention provides a video decoding apparatus which decodes encoded data of a video signal which has been generated using the video encoding method described above, and which includes: a device which, when motion compensation having a decimal fraction pixel accuracy is used for an inter-frame prediction, changes the interpolation accuracy of a downsampled signal element in a partial area within the reference frame in accordance with a ratio between the downsampling ratio of each partial area within the frame targeted for decoding and the downsampling ratio of the partial area within the reference frame which is referred to when this partial area undergoes motion compensation; and a device which generates an interpolated image of the partial area within the reference frame based on the changed interpolation accuracy.

Here, the video encoding method of the present invention and the video decoding method of the present invention which are realized by the respective processing devices described above being operated can also be realized by means of a computer program. This computer program may be supplied by being recorded on a suitable computer-readable recording medium, or may be supplied via a network. When the present invention is to be implemented, the computer program is installed, and is then able to realize the present invention by being operated by a control device such as a CPU.

In the video encoding apparatus of the present invention which is structured in this manner, the interpolation accuracy of a downsampled signal element in a partial area within a reference frame is changed in accordance with a ratio between the downsampling ratio of a partial area within a frame targeted for encoding and the downsampling ratio of a partial area within the reference frame which is referred to when motion compensation is performed on this partial area, and an interpolated image of the partial area within the reference frame is generated based on the changed interpolation accuracy.

Moreover, in the video decoding apparatus of the present invention which is structured so as to correspond to this, the interpolation accuracy of a downsampled signal element in a partial area within a reference frame is changed in accordance with a ratio between the downsampling ratio of a partial area within a frame targeted for decoding and the downsampling ratio of a partial area within the reference frame which is referred to when motion compensation is performed on this partial area, and an interpolated image of the partial area within the reference frame is generated based on the changed interpolation accuracy.

In accordance with this structure, according to the present invention, when a structure is employed in which a downsampling ratio is changed adaptively with in units of slices within a frame, even if the interpolation accuracy of a reference frame changes in accordance with this structure, it is possible to generate an interpolated image of a reference frame which realizes the required motion compensation.

Effects of the Invention

According to the present invention, when encoding video, it is possible to adaptively change the downsampling ratio of a specific signal element in accordance with the characteristics of each frame or in accordance with localized characteristics within a frame, and to consequently achieve an efficient code reduction in accordance with visual sensitivity.

Moreover, according to the present invention, even if the combination pattern of blocks changes for each signal element as a result of a downsampling ratio being changed adaptively, it is possible for a structure, which is used in a standard video encoding apparatus which appends to blocks having a certain size information showing whether or not a quantized signal contains a significant coefficient, to be used without this structure being changed.

In addition, according to the present invention, when motion compensation having a decimal fraction pixel accuracy is used for an inter-frame prediction, even if there is a change in the interpolation accuracy of a reference frame as a result of a downsampling ration being changed adaptively, it is possible to generate an interpolated image of the reference frame which realizes the required motion compensation.

BRIEF DESCRIPTION OF THE DRAWINGS

FIG. 7A is an explanatory diagram of a chrominance shared block set.
FIG. 7B is also an explanatory diagram of a chrominance shared block set.
FIG. 7C is also an explanatory diagram of a chrominance shared block set.
FIG. 7D is also an explanatory diagram of a chrominance shared block set.
FIG. 8 is an explanatory diagram showing interpolation accuracies of a reference frame.

DESCRIPTION OF THE REFERENCE NUMERALS

Figure 1:
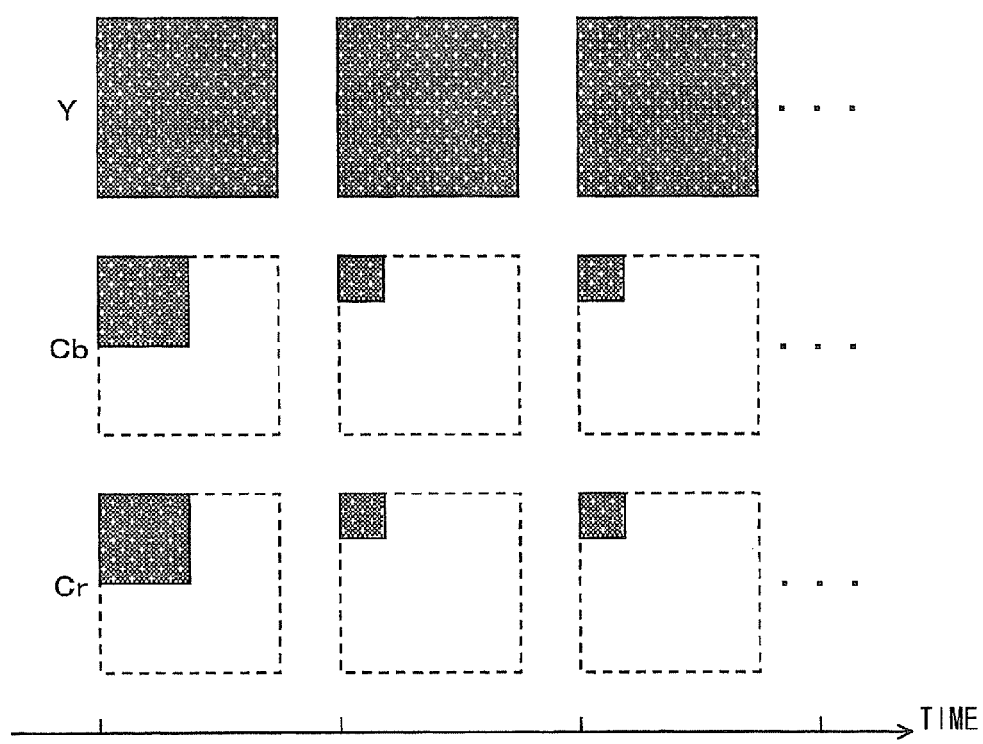
FIG. 1 is an explanatory diagram showing downsampling processing according to the present invention.

100 Adaptive processing flag setting section
101 Adaptive processing flag storage section
102 Luminance signal reading section
103 Luminance signal storage section
104 Chrominance signal reading section
105 Chrominance signal storage section
106 Downsampling ratio setting section
107 Downsampling ratio storage section
108 Chrominance signal downsampling processing section
109 Chrominance signal storage section
110 Chrominance-possessing macroblock position information setting section
110-1 Sequence adaptive processing section
110-2 Slice adaptive processing section
110-3 Chrominance adaptive processing section
111 Encoded stream generation section
111-1 Header information encoding section
111-2 Header information encoded stream storage section
111-3 Luminance signal—chrominance signal encoding processing section
111-4 Luminance signal—chrominance signal encoded stream storage section
111-5 Encoded stream multiplexing section
112 Encoded stream storage section
113 Final slice determination section

BEST MODE FOR CARRYING OUT THE INVENTION

Hereinafter, the present invention will be described in detail in accordance with the embodiments.

In the present invention, novel video encoding and decoding technology is realized which efficiently reduces code amounts by introducing adaptive downsampling processing for each frame and by introducing adaptive downsampling processing for each area within each frame.

Required functions in an encoder and a decoder in order to introduce this type of adaptive downsampling processing are described below.

Note that in the example given below, the chrominance element in a color space formed by a luminance signal (Y) and two chrominance elements (Cb, Cr) is the downsampling target, however, targets of the present invention are not limited to these color space signals.

For example, the present invention can also be applied in the same way to three elements obtained by performing any color transformation on 4:4:4 format video signals. Furthermore, the number of elements on which adaptive downsampling processing is performed is not limited to any specific number. For example, when a first principal element, a second principal element, and a third principal element are obtained using KL transformation for the color transformation, then any one of these elements may be the downsampling target. Moreover, another example might be for any two of these three elements (for example, the second principal element and the third principal element) to be the downsampling target. Furthermore, it is naturally also possible for all three of these elements to be the downsampling target.

Furthermore, the present invention can also be applied in the same way when a signal other than a color space signal is the downsampling target.

[1] Frame Unit Adaptive Processing

In a first aspect of the present invention, a frame downsampling ratio is adaptively changed for a chrominance element in accordance with the characteristics inside the frame.

The frame downsampling ratio is $r_f[t](<1)$ as defined by the following formula:

$$r_f[t] = W'[t]/W[t] = H'[t]/H[t]$$

when the size of a $t^{th}$ frame of a 4:4:4 format video is taken as $W[t] \times H[t]$[pixels], and when the frame size of a chrominance element after downsampling is taken as $W'[t] \times H'[t]$[pixels].

The example shown in FIG. 1 is an example in which the frame downsampling ratio is set to 1/2, 1/4, 1/4 in sequence from the leading frame.

Here, the frame downsampling ratios of the two chrominance elements (i.e., the Cb and Cr elements) are the same value.

Here, it is also possible to set frame downsampling ratios independently for the two chrominance elements (i.e., the Cb and Cr elements).

Figure 2:
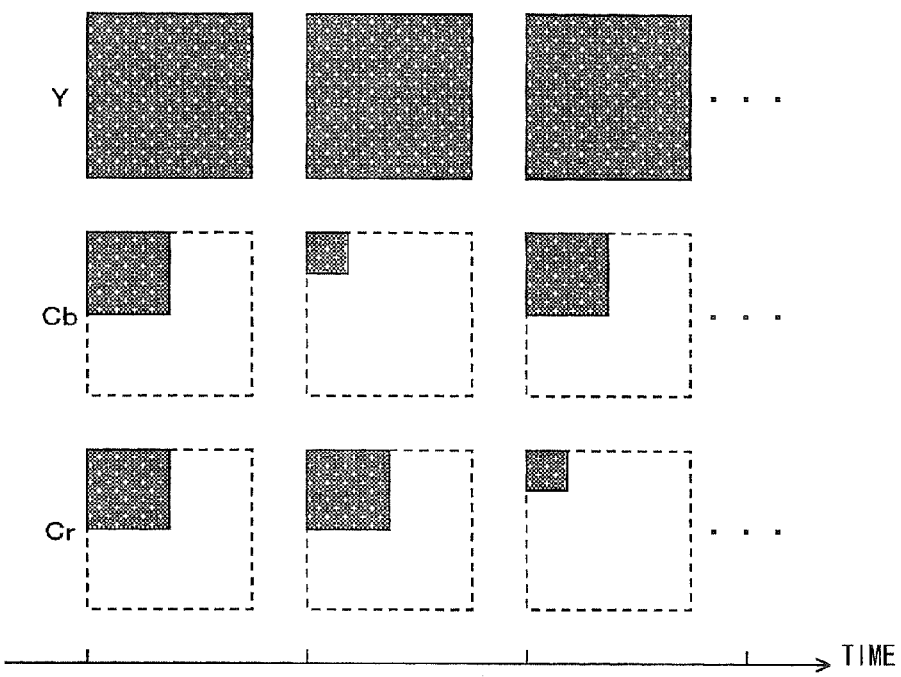
FIG. 2 is an explanatory diagram showing downsampling processing according to the present invention.

FIG. 2 shows an example of this. Here, in sequence from the leading frame, the frame downsampling ratio for the Cb element is set to 1/2, 1/4, 1/2, while the frame downsampling ratio for the Cr element is set to 1/2, 1/2, 1/4.

The method used to set the downsampling ratio for each frame is provided from an external mechanism which is provided separately from the mechanism performing the downsampling.

For example, it is possible to set a downsampling ratio for each frame in accordance with the size of the amount of transition (i.e., change) within a frame.

When a frame having a large amount of transition is compared to a frame having a small amount of transition, then there is a relatively low level of visual sensitivity in the former. Because of this, in a frame having a large amount of transition, it is possible to set a small downsampling ratio so that large downsampling is conducted compared with a frame having a small amount of transition.

Accordingly, in this case, the mechanism which sets the downsampling ratio detects the size of the transition amount for a frame, determines the downsampling ratio which corresponds to this size, and then gives a command to the mechanism performing the downsampling to downsample this frame in accordance with the determined downsampling ratio.

[2] Slice Unit Adaptive Processing

In a second aspect of the present invention, the slice downsampling ratio is adaptively changed for chrominance elements in accordance with the characteristics within a frame.

The slice downsampling ratio is $r_s[t,i](<1)$ as defined by the following formula:

$$r_s[t,i] = w'[t,i]/w[t,i] = h'[t,i]/h[t,i]$$

when a $t^{th}$ frame of a 4:4:4 format video chrominance element is divided into several partial areas (referred to as 'slices'), and the size of the $i^{th}$ slice is taken as $w[t,i] \times h[t,i]$[pixels], and when the size of the $i^{th}$ slice after downsampling is taken as $w'[t,i] \times h'[t,i]$[pixels].

Here, $I=0, 1, \ldots, I-1$, wherein I is the total number of slices within a frame.

Figure 3:
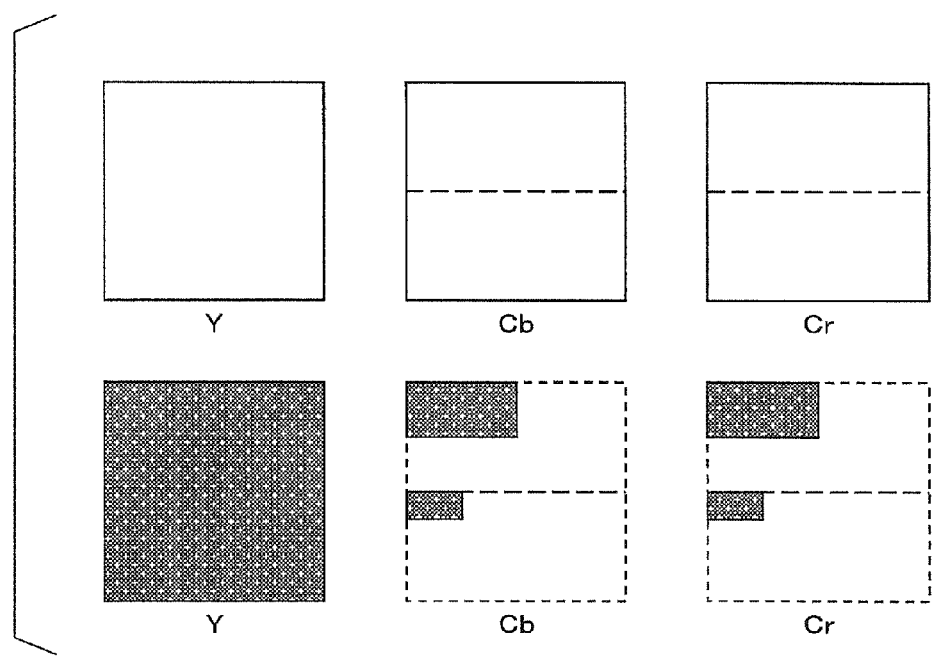
FIG. 3 is an explanatory diagram showing downsampling processing according to the present invention.

The top row in FIG. 3 shows an example of a case in which chrominance element frames are divided into two slices. Hereinafter, for convenience, of these two slices, the top slice is referred to as the first slice, while the bottom slice is referred to as the second slice.

In this example, as is shown in the bottom row in FIG. 3, the slice downsampling ratio of the first slice is set to 1/2 and the slice downsampling ratio of the second slice is set to 1/4. Here, the slice downsampling ratios of the two chrominance elements (i.e., the Cb and Cr elements) are the same value.

Here, it is also possible to set slice downsampling ratios independently for the two chrominance elements (i.e., the Cb and Cr elements).

Figure 4:
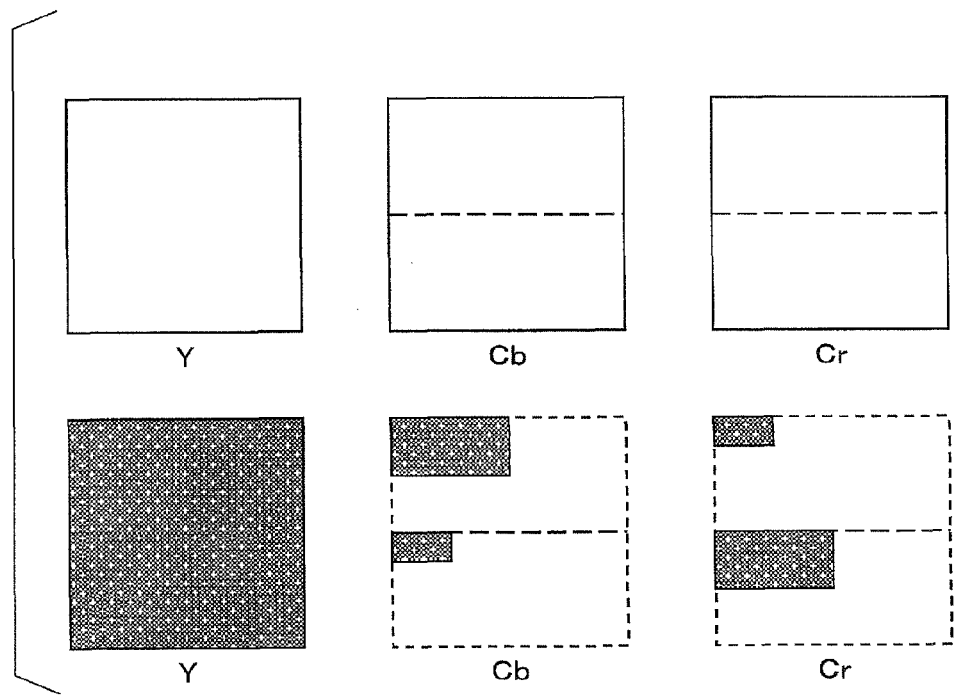
FIG. 4 is an explanatory diagram showing downsampling processing according to the present invention.

FIG. 4 shows an example of this. As is shown in the top row, in the same slice division settings as in FIG. 3, the slice downsampling ratios for the first slice and the second slice of the Cb element are set respectively to 1/2 and 1/4, while the slice downsampling ratios for the first slice and the second slice of the Cr element are set respectively to 1/4 and 1/2.

While the above described frame downsampling ratios enable the downsampling ratio to be changed for each frame, these slice downsampling ratios further enable the downsampling ratio to be changed in localized areas within a frame.

The method used to divide a frame into slices and the method used to set the slice downsampling ratio for each slice are provided from an external mechanism which is provided separately from the mechanism performing the slice downsampling.

For example, it is possible to divide a frame into slice areas in accordance with the size of the amount of transition (i.e., change). When a slice having a large amount of transition is compared to a slice having a small amount of transition, then there is a relatively low level of visual sensitivity in the former. Because of this, in a slice having a large amount of transition, it is possible to set a small slice downsampling ratio so that large-scale slice downsampling is conducted compared with a slice having a small amount of transition.

Accordingly, in this case, the mechanism which sets the slice downsampling ratios detects the size of the transition amount for each small area within a frame, divides the frame into slice areas based on this and also determines for each slice the slice downsampling ratio which corresponds to the transition amount within that slice, and then gives a command to the mechanism performing the slice downsampling to perform slice downsampling on the relevant slice in accordance with the determined slice downsampling ratio.

[3] Encoding Block Pattern

Next, a description will be given of bit allocation relating to CBP (described below) when the adaptive frame downsampling and slice downsampling of the present invention are performed.

In H.264, the luminance element of 16×16 [pixels] and the chrominance element of two 8×8 [pixels] are known as a macroblock, and a transformation coefficient is transformed into an encoded stream in units of these macroblocks.

Figure 5:
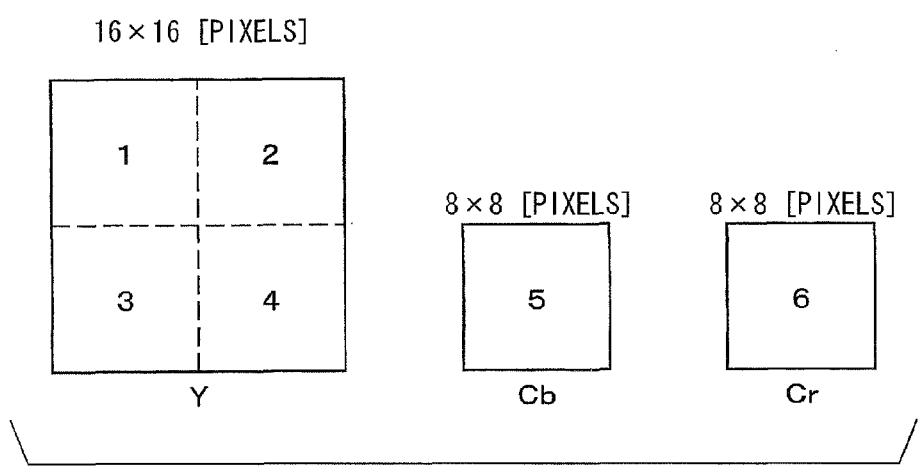
FIG. 5 is an explanatory diagram of a CBP.

At this time, as is shown in FIG. 5, six bits of information indicating whether or not the transformation coefficient within each sub block includes a significant coefficient (i.e., a non-zero coefficient) are appended to six sub blocks which are formed by four 8×8 [pixels] luminance element sub blocks and two chrominance element sub blocks of identical size. This information is called a "Coded Block Pattern" (CBP).

Note that the numerals inside the sub blocks in FIG. 5 show the position of the bit within the CBP for each sub block.

Encoding information for a transformation coefficient other than a CBP is not appended to sub blocks in which the corresponding bit within the CBP is 0. This is because this processing is intended to reduce the amount of code. In contrast, transformation coefficient information is appended to sub blocks in which the bit is 1.

In H.264, a reduction in the amount of code is achieved using this type of CBP, and if the adaptive frame downsampling and slice downsampling of the present invention are to be performed, it is necessary to build a structure which enables this CBP to be used.

Accordingly, in the present invention, when the downsampling ratio of the chrominance elements is variable, then the bit allocation for this CBP is modified.

Next, a description will be given of the bit allocation for the CBP of the present invention.

As an example, a case is considered in which the size of the luminance elements in a macroblock is taken as 16×16, and the frame downsampling ratio (or slice downsampling ratio) is taken as r (<1/2).

In this case, two types of macroblock having different structural elements are generated.

Namely, these two types of macroblock are a macroblock which is formed by six sub blocks which are formed by four 8×8 [pixels] luminance element sub blocks and two chrominance element sub blocks of identical size, and a macroblock which is formed only by four 8×8 [pixels] luminance element sub blocks.

In the case of the former, in the same way as in the conventional technology, the CBP is represented by 6 bits. In contrast, in the case of the latter, the CBP is represented by 4 bits.

Figure 6:
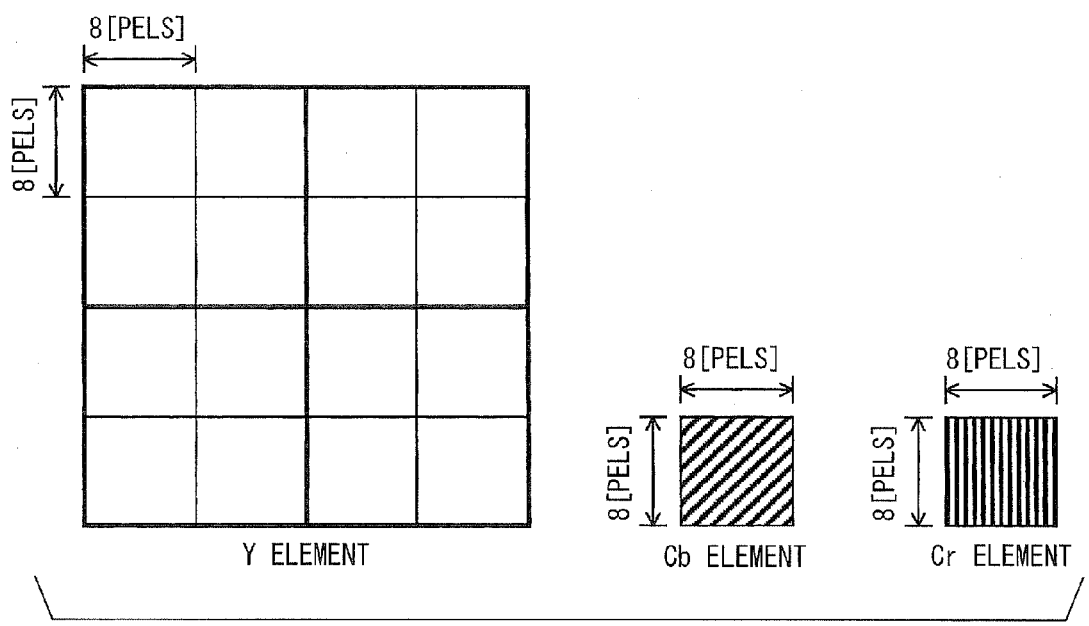
FIG. 6 is a diagram showing an example of a luminance element and a downsampled chrominance element.

FIG. 6 shows an example in which r=1/4. In this case, four combinations of chrominance elements and luminance elements may be considered as shown in FIG. 7A through FIG. 7D. Because of this, information showing at which position a macroblock possessing a chrominance element is located is required.

A group of pixels which is formed by chrominance elements and by the luminance elements which share these chrominance elements is called a chrominance shared block set. Namely, in any one of FIG. 7A through FIG. 7D, the chrominance elements (i.e., the portion indicated by the shading in the drawing) belonging to a macroblock is shared by the other three macroblocks (i.e., those having only luminance elements).

Moreover, in a chrominance shared block set, the position of a macroblock possessing chrominance elements is called a chrominance-possessing macroblock position.

A method of representing this chrominance-possessing macroblock position will now be described in relation to the method of representation used by the present invention.

[3-1] Third Aspect of the Present Invention

This is a method in which a chrominance-possessing macroblock position is determined in advance.

For example, in this example it is determined that only the macroblock which is closest to the beginning in the scanning sequence possesses a chrominance element. If this position is shared by an encoder and a decoder in advance, then decoding can be performed in the decoder without any additional information.

[3-2] Fourth Aspect of the Present Invention

This is a method in which a chrominance-possessing macroblock position is set on the encoder side for each sequence (i.e., an entire compressed video). In this case, the chrominance-possessing macroblock position is set as a fixed value within the sequence. In conjunction with this, it is necessary to append the information below in an encoded stream as encoding information.

Firstly, a flag (chroma-position-sequence-adaptive) indicating whether or not this adaptive processing is to be applied is appended to an encoded stream as header information.

This flag is set to 1 when this adaptive processing is being performed, and is set to 0 when this adaptive processing is not being performed.

Furthermore, because the chrominance-possessing macroblock position changes for each sequence, a chrominance-possessing macroblock position is appended to an encoded stream as header information about the sequence for each sequence. This processing is called sequence adaptive chrominance-possessing macroblock position varying processing.

[3-3] Fifth Aspect of the Present Invention

This is a method in which a chrominance-possessing macroblock position is set on the encoder side for each slice.

Here, as is described above, the term 'slice' indicates a partial area obtained by dividing the interior of each frame. The specific division method is provided from a mechanism for determining slice divisions which is provided externally.

In this case, the chrominance-possessing macroblock position is set as a fixed value within the slice. In conjunction with this, it is necessary to append the information below in an encoded stream as encoding information.

Firstly, a flag (chroma-position-slice-adaptive) indicating whether or not this adaptive processing is to be applied is appended to an encoded stream as header information. This flag is set to 1 when this adaptive processing is being performed, and is set to 0 when this adaptive processing is not being performed.

Furthermore, because the chrominance-possessing macroblock position changes for each slice, it is necessary to append a chrominance-possessing macroblock position to an encoded stream as header information about the slice to each slice. This processing is called slice adaptive chrominance-possessing macroblock position varying processing.

[3-4] Sixth Aspect of the Present Invention

This is a method in which a chrominance-possessing macroblock position is set on the encoder side for each chrominance shared block set. In this case, it is possible to change the chrominance-possessing macroblock position for each chrominance shared block set. In conjunction with this, it is necessary to append the information below to an encoded stream as encoding information.

Firstly, a flag (chroma-position-MBs-adaptive) indicating whether or not this adaptive processing is to be applied is appended to an encoded stream as header information. This flag is set to 1 when this adaptive processing is being performed, and is set to 0 when this adaptive processing is not being performed.

Furthermore, because the chrominance-possessing macroblock position changes for each chrominance shared block set, it is necessary to append a chrominance-possessing macroblock position to an encoded stream as header information about the chrominance shared block set to each chrominance shared block set. This processing is called chrominance shared block set adaptive chrominance-possessing macroblock position varying processing.

[4] Motion Vector Encoding Format

Next, a description will be given of a motion vector encoding format when the adaptive frame downsampling and slice downsampling of the present invention are performed.

Within a chrominance shared block set, luminance elements and chrominance elements are taken as sharing the same motion vector information. However, for the chrominance, it is necessary to perform scaling on the motion vector in accordance with the downsampling ratio.

For example, when the motion vector appended to the encoded stream is v=(4, 8), and the downsampling ratio is 1/4, then the motion vector of the luminance element is v=(4, 8), and the motion vector of the chrominance element is (1/4)× v =(1, 2).

[4-1] Seventh Aspect of the Present Invention

The interpolation accuracy of the chrominance element of a reference frame is changed based on Formula (1) given below in accordance with the frame downsampling ratio of a frame targeted for encoding (i.e., a $t^{th}$ frame) and a reference frame (i.e., a $t-1^{th}$ frame), and, based on this, an interpolated image of the chrominance element of the reference frame is generated.

Note that in the formula given below, $r_f[t]$ is the frame downsampling ratio of the frame targeted for encoding, while $r_f[t-1]$ is the frame downsampling ratio of the reference frame.

When a motion estimation accuracy (i.e., a motion compensation accuracy) of the luminance element of the $t^{th}$ frame is 1/M, then the interpolation accuracy A of the chrominance element of the reference frame is determined in accordance with the following Formula (1)

$$A=(r_f[t-1]/r_f[t])\times(1/M) \quad (1)$$

For example, when the motion estimation of the luminance element of the frame targeted for encoding has an accuracy of 1/4 pixels, and when the downsampling ratio of the chrominance element of the frame targeted for encoding is 1/4, and when the downsampling ratio of the chrominance element of the reference frame is 1/2, then, in accordance with Formula (1), the motion interpolation accuracy A of the chrominance element of the reference frame is found to be an accuracy of 1/2 pixels.

$$A=(1/2)\div(1/4)\times(1/4)=1/2$$

This is for the following reason. When the downsampling ratio of the chrominance element of the frame targeted for encoding is 1/4, then the motion vector of the chrominance element which is used is obtained by scaling the motion vector of the luminance element by 1/4. By performing this scaling, information of less than one pixel of the motion vector is discarded, and the motion estimation accuracy of the chrominance element of the frame targeted for encoding is made into an accuracy of 1 pixel.

In contrast, the downsampling ratio of the reference frame is 1/2, and is the resolution of half the luminance signal. Because of this, in order to obtain information about the integer pixel position required for the chrominance element of the frame targeted for encoding, it is necessary to obtain the information for a position which corresponds to a 1/2 pixel in the reference frame by interpolation.

FIG. 8 shows the collected results of the interpolation accuracy (i.e., the interpolation accuracy A determined using Formula (1)) of the reference frame when the motion estimation accuracy of the luminance element is an accuracy of 1/4 pixels, and the downsampling ratios of the frame targeted for encoding and of the reference frame are changed by 1, 1/2, 1/4.

Here, the motion estimation accuracy required for the (chrominance element of the) frame targeted for encoding shown in FIG. 8 is determined in accordance with the following formula.

$$(1/r_f[t])\times(1/M)$$

[4-2] Eighth Aspect of the Present Invention

The interpolation accuracy in a slice of a chrominance element of the reference frame is changed based on Formula (2) given below in accordance with the slice downsampling ratios of the frame targeted for encoding (i.e. the $t^{th}$ frame) and the reference frame (i.e., the $t-1^{th}$ frame). Based on this, an interpolated image of the slice of the chrominance element of the reference frame is generated.

Note that in the formula given below, a case is considered in which a block within an $i^{th}$ slice of the frame targeted for encoding takes an area within a $j^{th}$ slice of the reference frame as a reference signal during motion compensation.

At this time, the slice downsampling ratio of the $i^{th}$ slice of the frame targeted for encoding is $r_s[t,i]$, while the slice downsampling ratio of the $j^{th}$ slice of the reference frame is $r_s[t-1, j]$.

When a motion estimation accuracy of the luminance element of the $t^{th}$ frame is 1/M, then the interpolation accuracy A [j] of the $j^{th}$ slice of the chrominance element of the reference frame is determined in accordance with the following Formula (2)

$$A[j]=(r_s[t-1,j]/r_s[t,i])\times(1/M) \quad (2)$$

Embodiments

Next, the present invention will be described in detail in accordance with the following embodiments.

Figure 9:
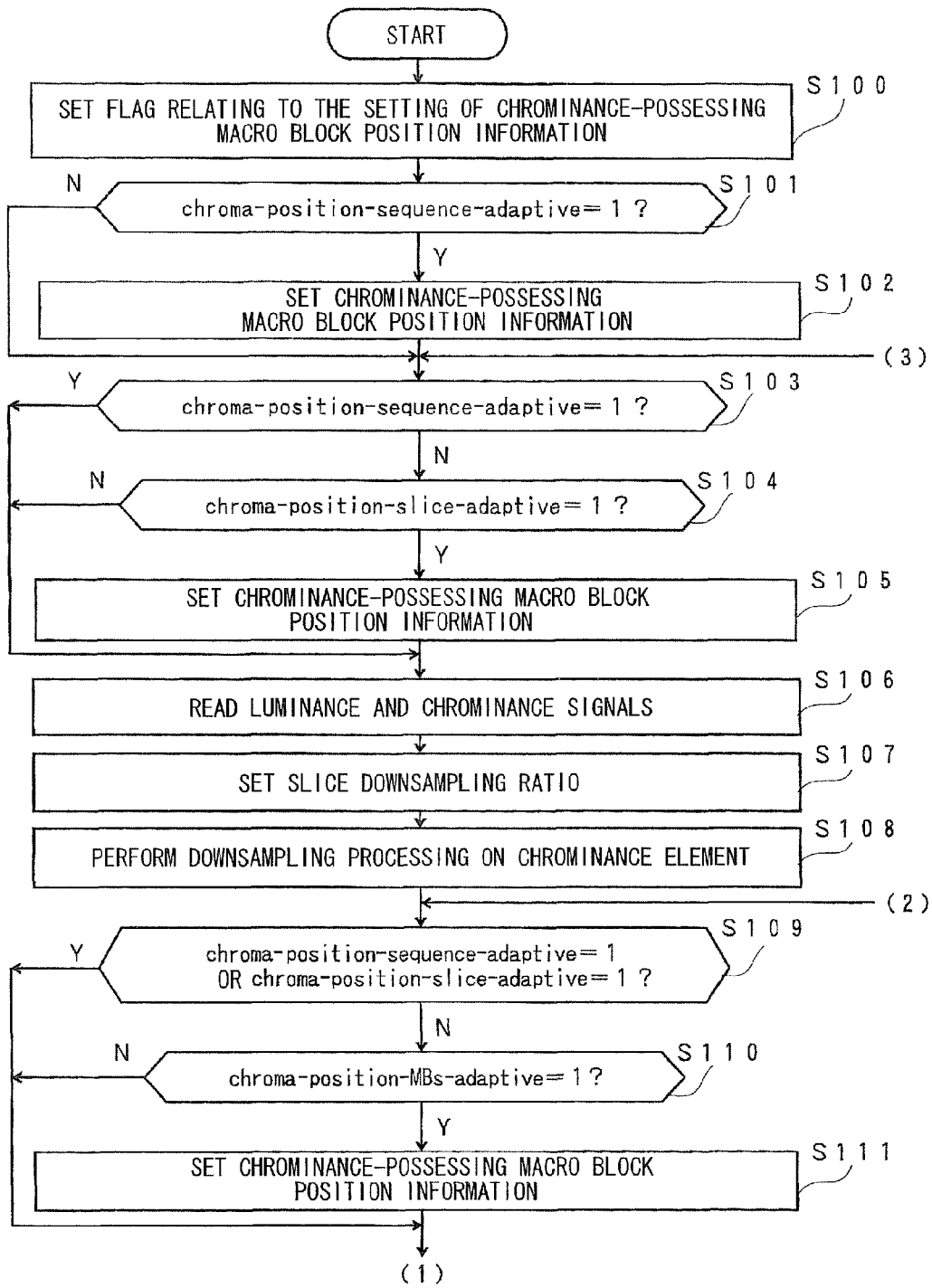
FIG. 9 is an embodiment of a flowchart showing encoding processing according to the present invention.
Figure 10:
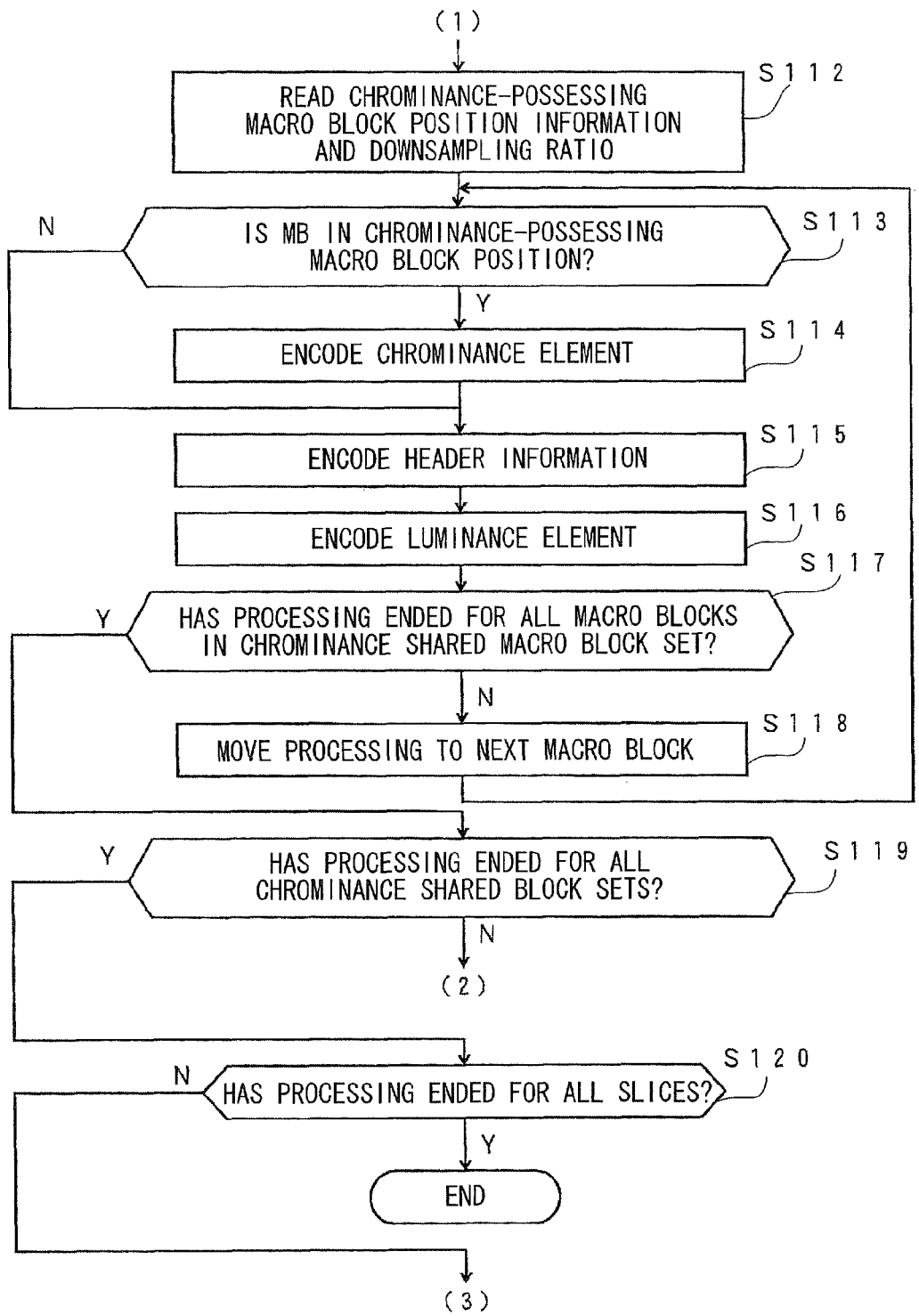
FIG. 10 is a continuation of the flowchart shown in FIG. 9.

FIG. 9 and FIG. 10 show an embodiment of a flowchart showing the encoding processing executed by the present invention. The encoding processing executed by the present invention will be described in detail in accordance with this flowchart.

Step S100: The flags relating to the setting of the chrominance-possessing macroblock position information (i.e., chroma-position-sequence-adaptive, chroma-position-slice-adaptive, and chroma-position-MBs-adaptive) are read, and written in registers. This is to determine whether the above described sequence adaptive chrominance-possessing macroblock position varying processing, or the above described slice adaptive chrominance-possessing macroblock position varying processing, or the above described chrominance shard block set adaptive chrominance-possessing macroblock position varying processing is to be used.

Step S101: A determination is made as to whether or not a chroma-position-sequence-adaptive flag which relates to the setting of the chrominance-possessing macroblock position information is set to 1, and if the result of this determination is a true value (namely, Y (Yes)), the routine moves to step S102. If, however, the determination result is N (No), the routine moves to step S103.

Step S102: Processing to set the chrominance-possessing macroblock position information is performed, and the chrominance-possessing macroblock position information is written in the register.

Here, the chrominance-possessing macroblock position information which has been set is used throughout the encoding of the entire sequence. This corresponds to the fourth aspect described above.

The specific setting values are provided from an externally provided mechanism which performs the setting of the chrominance-possessing macroblock position information. For example, a method may be used in which, taking the weighted sum of encoding distortion and code amount as a cost function, the chrominance-possessing macroblock position information is set such that this cost function is minimized.

Step S103: A determination is made as to whether or not the chroma-position-sequence-adaptive flag which relates to the setting of the chrominance-possessing macroblock position information is set to 1, and if the result of this determination is a true value, the routine moves to step S106. If, however, the determination result is not a true value, the routine moves to step S104.

Step S104: A determination is made as to whether or not a chroma-position-slice-adaptive flag which relates to the setting of the chrominance-possessing macroblock position information is set to 1, and if the result of this determination is a true value, the routine moves to step S105. If, however, the determination result is not a true value, the routine moves to step S106.

Step S105: Processing to set the chrominance-possessing macroblock position information is performed, and the chrominance-possessing macroblock position information is written in the register.

Here, the chrominance-possessing macroblock position information which has been set is used throughout the encoding in a slice. This corresponds to the fifth aspect described above.

The specific setting values are provided from an externally provided mechanism which performs the setting of the chrominance-possessing macroblock position information. For example, a method may be used in which, taking the weighted sum of encoding distortion and code amount as a cost function, the chrominance-possessing macroblock position information is set such that this cost function is minimized.

Step S106: The luminance signal and chrominance signal of the slice currently being observed is read and written in the register.

Step S107: A downsampling ratio is set for the chrominance signal. Here, the set downsampling ratio is the slice downsampling ratio.

The specific setting values are provided from an externally provided mechanism which performs the setting of the slice downsampling ratio. For example, in a slice having a low luminance value, a method may be employed in which a small downsampling ratio is set such that large-scale downsampling is performed on the chrominance element.

Step S108: The set downsampling ratio and the chrominance signal written in the register are input, and downsampling processing of the chrominance element is performed in accordance with the input downsampling ratio. The chrominance element after the downsampling is written in the register.

The coefficient of the filter used in the downsampling is provided from an externally provided mechanism which determines filter coefficients in accordance with the downsampling ratio.

Step S109: A determination is made as to whether or not at least one of the chroma-position-sequence-adaptive flag or the chroma-position-slice-adaptive flag relating to the setting of the chrominance-possessing macroblock position information is set to 1, and if the result of this determination is a true value, the routine moves to step S112. If, however, the determination result is not a true value, the routine moves to step S110.

Step S110: A determination is made as to whether or not a chroma-position-MBs-adaptive flag which relates to the setting of the chrominance-possessing macroblock position information is set to 1, and if the result of this determination is a true value, the routine moves to step S111. If, however, the determination result is not a true value, the routine moves to step S112.

Step S111: Processing to set the chrominance-possessing macroblock position information is performed, and the chrominance-possessing macroblock position information is written in the register. Here, the chrominance-possessing macroblock position information which has been set is used throughout the encoding of a chrominance shared block set. This corresponds to the sixth aspect described above.

The specific setting values are provided from an externally provided mechanism which performs the setting of the chrominance-possessing macroblock position information. For example, a method may be used in which, taking the weighted sum of encoding distortion and code amount as a cost function, the chrominance-possessing macroblock position information is set such that this cost function is minimized.

Step S112: The set chrominance-possessing macroblock position information and downsampling ratio are read and written in the registers.

Step S113: The chrominance-possessing macroblock position information which was written in the register in step S112 is input, and a determination is made as to whether or not the macroblock targeted for encoding is in the chrominance-possessing macroblock position. A true or false value is then output as the result of this determination.

If the output is a true value, the routine moves to step S114. If the output is a false value the routine moves to step S115.

Step S114: Using the chrominance signal as an input, encoding processing is performed, and the encoding result is written in the register.

The specific encoding method differs depending on the encoding algorithm which is used. For example, in H.264 and MPEG-2, the encoding method involves motion compensation and discrete cosine transform.

Step S115: Header information generated in the encoding is written in the register.

The specific symbols and the like targeted for encoding differ depending on the encoding algorithm which is used. For example, in the case of H.264, synchronous code forms the symbols targeted for encoding (here, symbol refers to structural units of information).

Step S116: Using the luminance signal as an input, encoding processing is performed, and the encoding result is written in the register.

The specific encoding method differs depending on the encoding algorithm which is used. For example, in H.264 and MPEG-2, the encoding method involves motion compensation and discrete cosine transform.

Step S117 and step S118: The processing of step S113 through step S116 is repeated for all of the macroblocks within the chrominance shared block set.

Step S119: The processing of step S109 through step S118 is repeated for all of the chrominance shared block sets within the slice.

Step S120: The processing of step S103 through step S119 is repeated for all of the slices within the sequence.

In this manner, in the present embodiment, luminance elements and chrominance elements are encoded while slice downsampling is performed for the chrominance elements in accordance with the slice downsampling ratio which has been set adaptively. In addition, processing is performed in order to set chrominance-possessing macroblock position information, which shows which macroblocks possess chrominance elements, and to encode this as header information.

Figure 11:
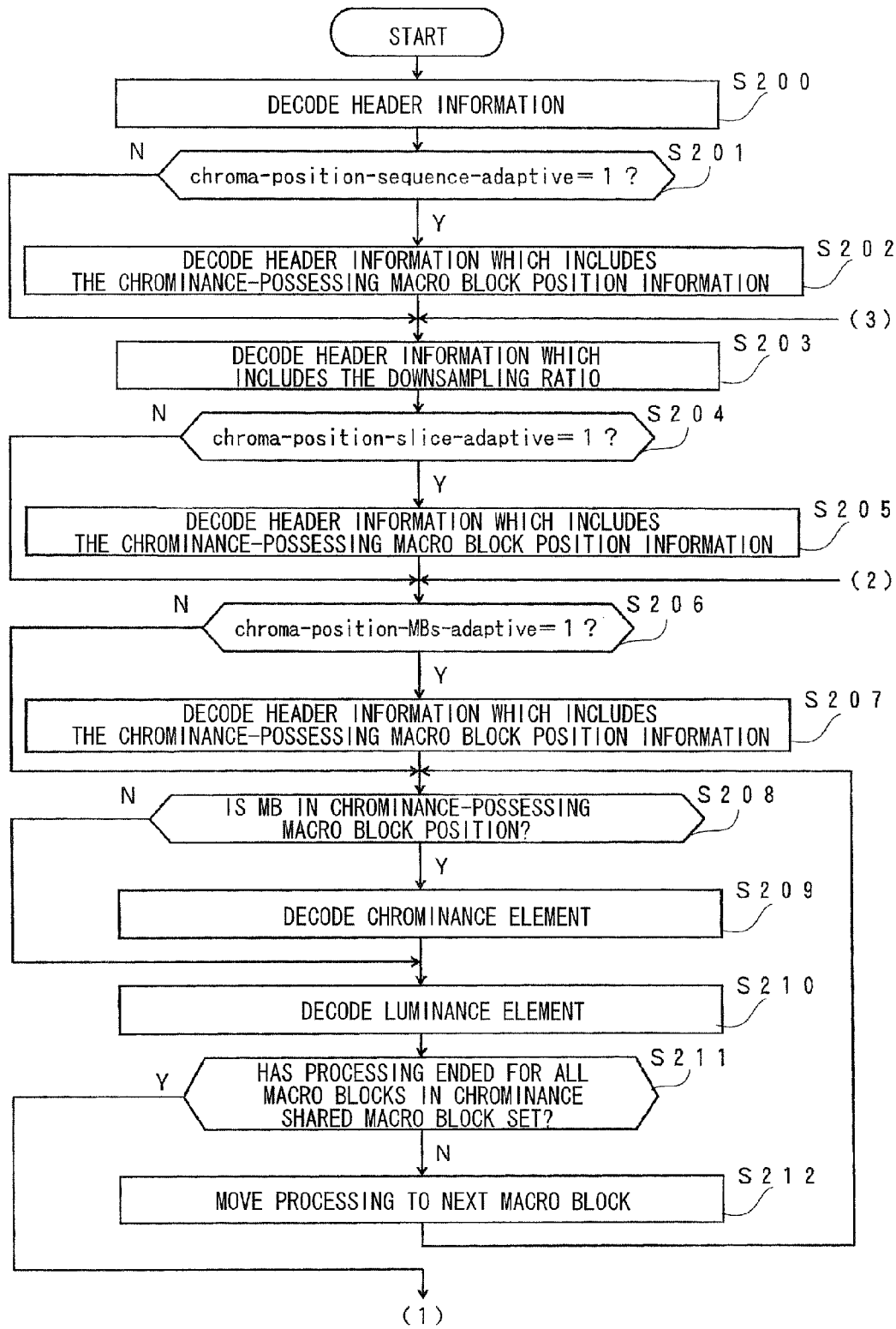
FIG. 11 is an embodiment of a flowchart showing decoding processing according to the present invention.
Figure 12:
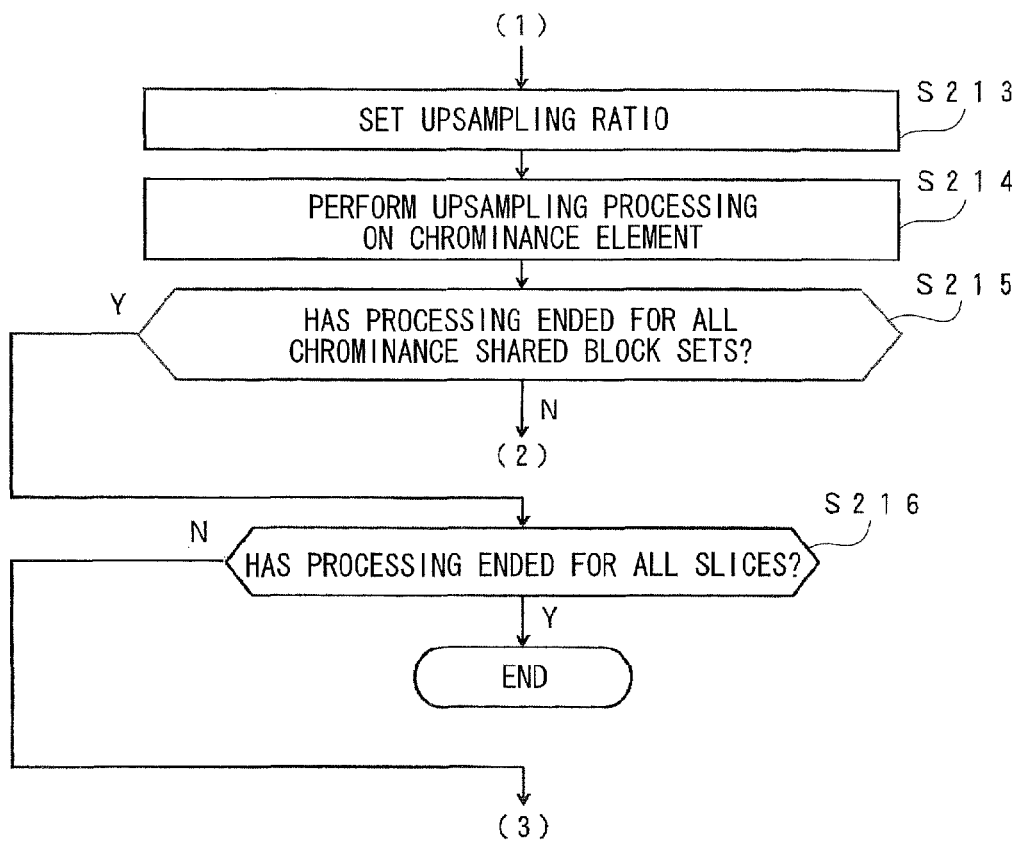
FIG. 12 is a continuation of the flowchart shown in FIG. 11.

FIG. 11 and FIG. 12 illustrate an embodiment of a flowchart showing decoding processing according to the present invention in which encoded data generated in the encoding processing of the flowchart shown in FIG. 9 and FIG. 10 is targeted for decoding. The decoding processing executed by the present invention will now be described in detail in accordance with this flowchart.

Step S200: Taking an encoded stream as an input, processing to decode a flag (chroma-position-sequence-adaptive, chroma-position-slice-adaptive, chroma-position-MBs-adaptive) relating to the setting of the chrominance-possessing macroblock position information is executed, and the value of the obtained flag is written in the register.

Step S201: A determination is made as to whether or not the chroma-position-sequence-adaptive flag relating to the setting of the chrominance-possessing macroblock position information is set to 1, and if the result of this determination is a true value, the routine moves to step S202. If, however, the determination result is not a true value, the routine moves to step S203.

Step S202: Taking the encoded stream as an input, processing to decode the chrominance-possessing macroblock position information is performed, and the value of the chrominance-possessing macroblock position information thus obtained is written in the register. This is the processing performed when the above described fourth aspect is used.

Step S203: Taking the encoded stream as an input, processing to decode the downsampling ratio is performed, and the value of the downsampling ratio is written in the register.

Step S204: A determination is made as to whether or not the chroma-position-slice-adaptive flag relating to the setting of the chrominance-possessing macroblock position information is set to 1, and if the result of this determination is a true value, the routine moves to step S205. If, however, the determination result is not a true value, the routine moves to step S206.

Step S205: Taking the encoded stream as an input, processing to decode the chrominance-possessing macroblock position information is performed, and the value of the chrominance-possessing macroblock position information thus obtained is written in the register. This is the processing performed when the above described fifth aspect is used.

Step S206: A determination is made as to whether or not the chroma-position-MBs-adaptive flag relating to the setting of the chrominance-possessing macroblock position information is set to 1, and if the result of this determination is a true value, the routine moves to step S207. If, however, the determination result is not a true value, the routine moves to step S208.

Step S207: Taking the encoded stream as an input, processing to decode the chrominance-possessing macroblock position information is performed, and the value of the chrominance-possessing macroblock position information thus obtained is written in the register. This is the processing performed when the above described sixth aspect is used.

Step S208: Taking the chrominance-possessing macroblock position information as an input, a determination is made as to whether or not the macroblock targeted for encoding is in a chrominance-possessing macroblock position, and a true or false value is output as the result of this determination. If the output is a true value, the routine moves to step S209. If the output is a false value the routine moves to step S210.

Step S209: Taking the encoded stream as an input, processing to decode the chrominance element is performed, and the decoding result is written in the register.

Step S210: Taking the encoded stream as an input, processing to decode the luminance element is performed, and the decoding result is written in the register.

Step S211 and step S212: The processing of step S208 through step S210 is repeated for all of the macroblocks within the chrominance shared block set.

Step S213: Taking the downsampling ratio which was decoded in step S203 as an input, processing to convert the downsampling ratio into an upsampling ratio is performed, and the calculated value is written in the register.

This upsampling ratio is an inverse number of the downsampling ratio.

Step S214: Taking the upsampling ratio obtained in step S213 and the chrominance element decoded in step S209 as inputs, upsampling processing is performed on this chrominance element, and the processed chrominance element is written in the register.

Step S215: The processing of step S206 through step S214 is repeated for all of the chrominance shared block sets within a slice.

Step S216: The processing of step S203 through step S215 is repeated for all of the slices within a sequence.

In this manner, in the present invention, taking the encoded data generated by the encoding processing shown in the flowcharts in FIG. 9 and FIG. 10 as the target for decoding, processing is performed to decode a video signal.

Figure 13:
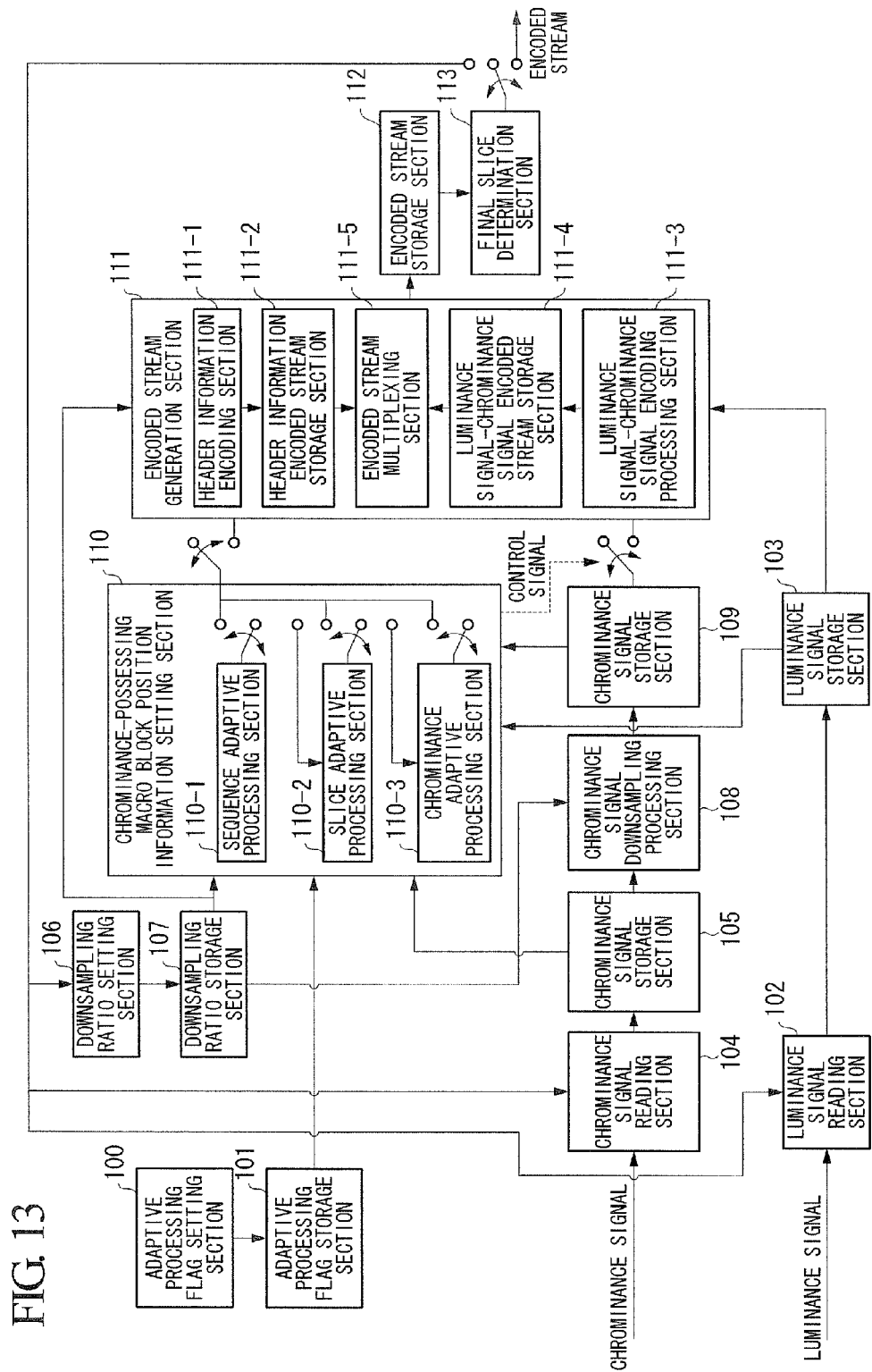
FIG. 13 is an embodiment of a video encoding apparatus of the present invention.

FIG. 13 shows an embodiment of a video encoding apparatus of the present invention which executes the encoding processing shown in the flowcharts in FIG. 9 and FIG. 10. A description of the apparatus structure of this video encoding apparatus will now be given in accordance with FIG. 13.

Here, in FIG. 13, 100 is an adaptive processing flag setting section, 101 is an adaptive processing flag storage section, 102 is a luminance signal reading section, 103 is a luminance signal storage section, 104 is a chrominance signal reading section, 105 is a chrominance signal storage section, 106 is a downsampling ratio setting section, 107 is a downsampling ratio storage section, 108 is a chrominance signal downsampling processing section, 109 is a chrominance signal storage section, 110 is a chrominance-possessing macroblock position information setting section, 111 is an encoded stream generation section, 112 is an encoded stream storage section, and 113 is a final slice determination section.

This chrominance-possessing macroblock position information setting section 110 is provided with a sequence adaptive processing section 110-1, a slice adaptive processing section 110-2, and a chrominance adaptive processing section 110-3.

Moreover, the encoded stream generation section 111 is provided with a header information encoding section 111-1, a header information encoded stream storage section 111-2, a luminance signal—chrominance signal encoding processing section 111-3, a luminance signal—chrominance signal encoded stream storage section 111-4, and an encoded stream multiplexing section 111-5.

Next, a description of the processing executed by each of these processing sections will be given.

The adaptive processing flag setting section 100 reads the flags (chroma-position-sequence-adaptive, chroma-position-slice-adaptive, chroma-position-MBs-adaptive) relating to the setting of the chrominance-possessing macroblock position information, and writes them in the adaptive processing flag storage section 101.

The luminance signal reading section 102 reads luminance signals and writes them in the luminance signal storage section 103. The units in which the luminance signals are read are slices in the present embodiment; however, it is also possible to read them in larger units or smaller units than slices.

The chrominance signal reading section 104 reads chrominance signals and writes them in the chrominance signal storage section 105. The units in which the chrominance signals are read are slices in the present embodiment, however, it is also possible to read them in larger units or smaller units than slices.

The downsampling ratio setting section 106 performs processing to set downsampling ratios, and writes the set values in the downsampling ratio storage section 107. Here, the set downsampling ratios are slice downsampling ratios.

The specific setting values are provided from an externally provided mechanism which performs the setting of the slice downsampling ratio. For example, in a slice having a low luminance value, a method may be employed in which a small downsampling ratio is set such that large-scale downsampling is performed on the chrominance element.

The chrominance signal downsampling processing section 108 takes chrominance signals read from the chrominance signal storage section 105 and downsampling ratios read from the downsampling ratio storage section 107 as inputs, and performs downsampling processing on a chrominance element in accordance with an input downsampling ratio, and the downsampled chrominance element is written in the chrominance signal storage section 109.

The coefficient of the filter used in the downsampling is provided from an externally provided mechanism which determines filter coefficients in accordance with the downsampling ratio.

The chrominance-possessing macroblock position information setting section 110 takes luminance signals read from the luminance signal storage section 103, pre-downsampling chrominance signals read from the chrominance signal storage section 105, downsampled chrominance signals read from the chrominance signal storage section 109, and downsampling ratios read from the downsampling ratio storage section 107 as inputs, and performs processing to set chrominance-possessing macroblock position information. The obtained chrominance-possessing macroblock position information is given to the encoded stream generation section 111.

Moreover, based on the obtained chrominance-possessing macroblock position information, the downsampled chrominance signals output from the chrominance signal storage section 109 are given to the encoded stream generation section 111.

Note that the setting of the chrominance-possessing macroblock position information is described in detail in the flowcharts in FIG. 9 and FIG. 10.

The encoded stream generation section 111 performs the processing of the header information encoding section 111-1 through the encoded stream multiplexing section 111-5 described below.

The header information encoding section 111-1 reads the chrominance-possessing macroblock position information and the downsampling ratio as inputs together with other header information, and performs encoding processing. It then writes the obtained encoded stream in the header information encoded stream storage section 111-2.

The luminance signal—chrominance signal encoding processing section 111-3 takes luminance signals read from the luminance signal storage section 103 and downsampled chrominance signals read from the chrominance signal storage section 109 as inputs, and performs encoding processing. It then writes the obtained encoded stream in the luminance signal—chrominance signal encoded stream storage section 111-4.

The encoded stream multiplexing section 111-5 takes the encoded stream of the header information read from the header information encoded stream storage section 111-2 and the encoded stream for the luminance element and chrominance element read from the luminance signal—chrominance signal encoded stream storage section 111-4 as inputs, and multiplexes the two streams. It then writes the multiplexed stream in the encoded stream storage section 112.

The final slice determination section 113 determines whether or not the slice currently undergoing processing is the final slice in order to perform the above described processing for all slices within a sequence. It also outputs encoded streams stored in the encoded stream storage section 112.

In this manner, the video encoding apparatus shown in FIG. 13 executes the encoding processing shown in the flowcharts in FIG. 9 and FIG. 10 in accordance with the apparatus structure shown in FIG. 13.

Figure 14:
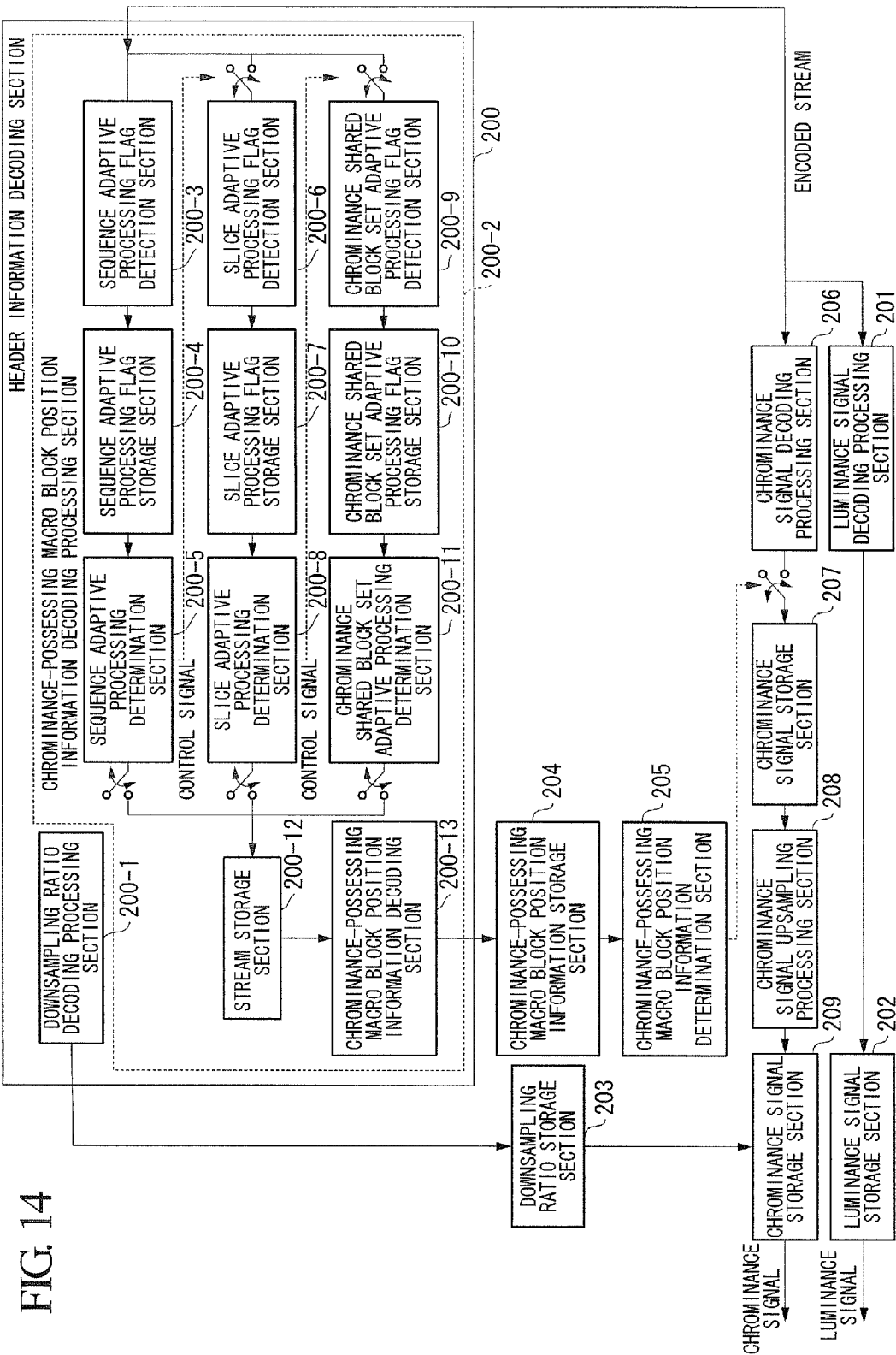
FIG. 14 is an embodiment of a video decoding apparatus of the present invention.

FIG. 14 shows an embodiment of a video decoding apparatus of the present invention which executes the decoding processing shown in the flowcharts in FIG. 11 and FIG. 12. A description of the apparatus structure of this video decoding apparatus will now be given in accordance with FIG. 14.

Here, in FIG. 14, 200 is a header information decoding section, 201 is a luminance signal decoding processing section, 202 is a luminance signal storage section, 203 is a downsampling ratio storage section, 204 is a chrominance-possessing macroblock position information storage section, 205 is a chrominance-possessing macroblock position information determination section, 206 is a chrominance signal decoding processing section, 207 is a chrominance signal storage section, 208 is a chrominance signal upsampling processing section, and 209 is a chrominance signal storage section.

This header information decoding section 200 is provided with a downsampling ratio decoding processing section 200-1, and with a chrominance-possessing macroblock position information decoding processing section 200-2.

The chrominance-possessing macroblock position information decoding processing section 200-2 is provided with a sequence adaptive processing flag detection section 200-3, a sequence adaptive processing flag storage section 200-4, a sequence adaptive processing determination section 200-5, a slice adaptive processing flag detection section 200-6, a slice adaptive processing flag storage section 200-7, a slice adaptive processing determination section 200-8, a chrominance shared block set adaptive processing flag detection section 200-9, a chrominance shared block set adaptive processing flag storage section 200-10, a chrominance shared block set adaptive processing determination section 200-11, a stream storage section 200-12, and a chrominance-possessing macroblock position information decoding section 200-13.

Next, the processing executed by each of these processing sections will be described.

The header information decoding section 200 performs processing to decode header information taking the encoded stream as an input. The targets of the decoding are the downsampling ratio, the chrominance-possessing macroblock position information, and other header information (i.e., signals which are not targeted for decoding processing by the luminance signal decoding processing section 201 and the chrominance signal decoding processing section 206).

The downsampling ratio decoding processing section 200-1 performs processing to decode the downsampling ratio using the encoded stream as an input, and then writes the downsampling ratio in the downsampling ratio storage section 203.

The chrominance-possessing macroblock position information decoding processing section 200-2 performs processing to decode the chrominance-possessing macroblock position information using the encoded stream as an input, and then writes the chrominance-possessing macroblock position information in the chrominance-possessing macroblock position information storage section 204.

The processing performed by the chrominance-possessing macroblock position information decoding processing section 200-2 includes the processing performed by the sequence adaptive processing flag detection section 200-3 through the processing performed by the chrominance-possessing macroblock position information decoding section 200-13 described below.

The sequence adaptive processing flag detection section 200-3 detects the chroma-position-sequence-adaptive flag which relates to the setting of the chrominance-possessing macroblock position information using the encoded stream as an input, and then writes the obtained flag value in the sequence adaptive processing flag storage section 200-4.

The sequence adaptive processing determination section 200-5 takes the value of the chroma-position-sequence-adaptive read from the sequence adaptive processing flag storage section 200-4 as an input, performs determination processing to determine whether or not the value is 1, and outputs a true or false value. If the output is a true value, it writes in the stream storage section 200-12 the encoded stream of the chrominance-possessing macroblock position information which follows on from the chroma-position-sequence-adaptive flag in the encoded stream.

If, however, the output is not a true value, then the encoded stream is input into the slice adaptive processing flag detection section 200-6.

The slice adaptive processing flag detection section 200-6 detects the chroma-position-slice-adaptive flag which relates to the setting of the chrominance-possessing macroblock position information using the encoded stream as an input, and writes the value of the obtained flag in the slice adaptive processing flag storage section 200-7.

The slice adaptive processing determination section 200-8 takes the value of the chroma-position-slice-adaptive read from the slice adaptive processing flag storage section 200-7 as an input, performs determination processing to determine whether or not the value is 1, and outputs a true or false value. If the output is a true value, then it writes in the stream storage section 200-12 the encoded stream of the chrominance-possessing macroblock position information which follows on from the chroma-position-slice-adaptive flag in the encoded stream.

If, however, the output is not a true value, then the encoded stream is input into the chrominance shared block set adaptive processing flag detection section 200-9.

The chrominance shared block set adaptive processing flag detection section 200-9 detects the chroma-position-MBs-adaptive flag which relates to the setting of the chrominance-possessing macroblock position information using the encoded stream as an input, and writes the value of the obtained flag in the chrominance shared block set adaptive processing flag storage section 200-10.

The chrominance shared block set adaptive processing determination section 200-11 takes the value of the chroma-position-MBs-adaptive read from the chrominance shared block set adaptive processing flag storage section 200-10 as an input, performs determination processing to determine whether or not the value is 1, and outputs a true or false value. If the output is a true value, then it writes in the stream storage section 200-12 the encoded stream of the chrominance-possessing macroblock position information which follows on from the chroma-position-MBs-adaptive flag in the encoded stream.

The chrominance-possessing macroblock position information decoding section 200-13 performs processing to decode the chrominance-possessing macroblock position information using the encoded stream read from the stream storage section 200-12 as an input, and writes the decoding result in the chrominance-possessing macroblock position information storage section 204.

The luminance signal decoding processing section 201 performs processing to decode luminance signals using the encoded stream as an input, and writes the result in the luminance signal storage section 202.

The chrominance-possessing macroblock position information determination section 205 takes the chrominance-possessing macroblock position information read from the chrominance-possessing macroblock position information storage section 204 as an input, and determines whether or not a macroblock targeted for encoding is in a chrominance-possessing macroblock position. If it is determined that it is in this position, then the chrominance-possessing macroblock position information determination section 205 sends a control signal such that the processing of the chrominance signal decoding processing section 206 is performed.

The chrominance signal decoding processing section 206 performs processing to decode chrominance signals using the encoded stream as an input, and writes the result in the chrominance signal storage section 207.

The chrominance signal upsampling processing section 208 takes downsampling ratios read from the downsampling ratios storage section 203 and chrominance signals read from the chrominance signal storage section 207 as an input, and calculates upsampling ratios based on the downsampling ratios, and then performs upsampling processing for these chrominance signals. It then writes the processed chrominance signals in the chrominance signal storage section 209.

In this manner, the video decoding apparatus shown in FIG. 14 executes the decoding processing shown in the flow charts in FIG. 11 and FIG. 12 in accordance with the apparatus structure shown in this FIG. 14.

Next, as is described above in the seventh aspect, in the present invention, when a downsampling ratio is changed adaptively in units of frames, it is possible to generate an interpolated image of a reference frame which realizes the required motion compensation.

Figure 15:
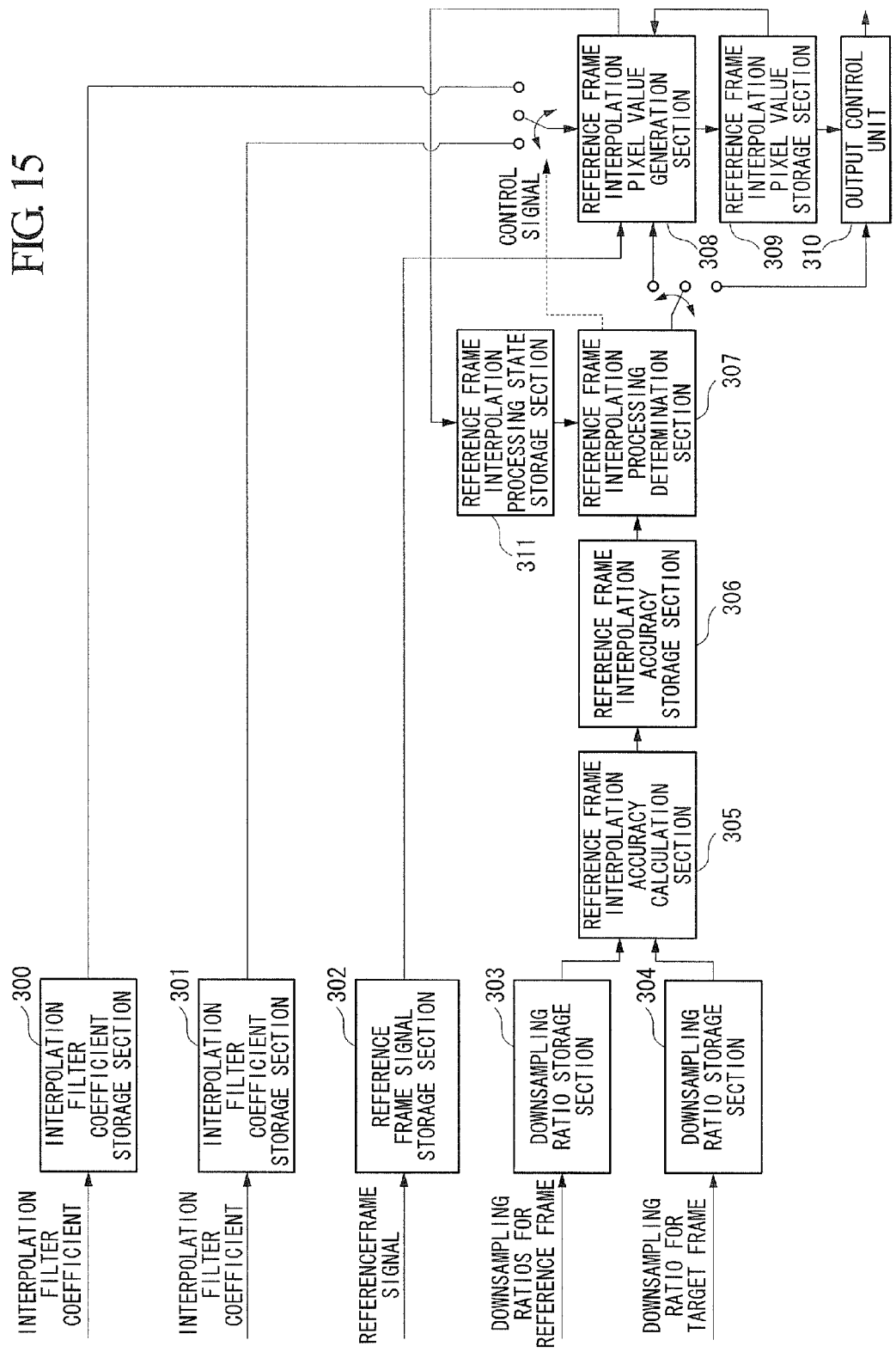
FIG. 15 is an embodiment of a reference frame interpolation image generation apparatus of the present invention.

FIG. 15 shows an embodiment of the reference frame interpolation image generation apparatus of the present invention which realizes this seventh aspect.

The reference frame interpolation image generation apparatus of the present invention which is constructed in this manner is used in the generation of a reference signal which is used in the motion estimation of a chrominance signal. This reference frame interpolation image generation apparatus may be applied in a reference signal generation processing section 1000 provided in a video encoding apparatus which employs a structure such as that shown in FIG. 16, or may be applied in a reference signal generation processing section 2000 provided in a video decoding apparatus which employs a structure such as that shown in FIG. 17.

Here, in FIGS. 15, 300 and 301 are an interpolation filter coefficient storage section, 302 is a reference frame signal storage section, 303 and 304 are downsampling ratio storage sections, 305 is a reference frame interpolation accuracy calculation section, 306 is a reference frame interpolation accuracy storage section, 307 is a reference frame interpolation processing determination section, 308 is a reference frame interpolation pixel value generation section, 309 is a reference frame interpolation pixel value storage section, 310 is an output control unit, and 311 is a reference frame interpolation processing state storage section.

The interpolation filter coefficient storage section 300 stores interpolation filter coefficients for reference frames in motion compensation.

In the same way, the interpolation filter coefficient storage section 301 stores interpolation filter coefficients for reference frames in motion compensation. In the present embodiment, in order to illustrate an example in which two types of filter coefficients are used selectively, two filter coefficients are stored respectively in individual storage sections.

For example, these filter coefficients are switched in accordance with the interpolation position (i.e., a 1/2 pixel position, or a 1/4 pixel position) in the motion compensation. Note that the present invention can be applied in the same way when two or more types of filter coefficient are used.

The reference frame signal storage section 302 stores reference frame signals in the motion compensation.

The downsampling ratio storage section 303 stores downsampling ratios for reference frames in the motion compensation.

The downsampling ratio storage section 304 stores downsampling ratios for target frames (i.e., frames targeted for encoding and frames targeted for decoding) in the motion compensation.

The reference frame interpolation accuracy calculation section 305 uses as inputs the downsampling ratios for reference frames read from the downsampling ratio storage section 303, and the downsampling ratios for target frames read from the downsampling ratio storage section 304, performs processing to calculate the interpolation accuracy required in a reference frame, and writes this in the reference frame interpolation accuracy storage section 306. The specific calculation method corresponds to Formula (1).

The reference frame interpolation processing determination section 307 uses as inputs interpolation accuracies of reference frames read from the reference frame interpolation accuracy storage section 306, and information (for example, information showing that interpolation processing is already completed for 1/2 pixel positions) showing the positions of pixels which have already undergone interpolation processing which is read from the reference frame interpolation processing state storage section 311, and determines whether or not all interpolated pixel values for a reference frame have been generated. If the result of this determination is a true value, the output control unit 310 is driven, and the value in the reference frame interpolation pixel value storage section 309 is output (namely, the final reference frame interpolation image is output).

If, however, the determination result is a false value, the routine moves to the processing of the reference frame interpolation pixel value generation section 308. At this time, information showing the position of the pixel targeted for interpolation is given to the reference frame interpolation pixel value generation section 308.

The reference frame interpolation pixel value generation section 308 takes information showing the position of a pixel targeted for interpolation as an input, and, in accordance with this information, reads filter coefficients from the interpolation filter coefficient storage section 300 or the interpolation filter coefficient storage section 301 as inputs.

Next, interpolation processing is performed using as inputs the pixel values of the reference frame read from the reference frame signal storage section 302, or the pixel values of the reference frame which also includes interpolated positions read from the reference frame interpolation pixel value storage section 309, and the result of this interpolation processing is written in the reference frame interpolation pixel value storage section 309.

Note that the reference frame interpolation pixel value storage section 309 at the start is initialized with a value of 0. Moreover, each time the processing for each reference frame ends, in the same way, it is initialized with a value of 0. In this manner, in this processing, an initial value is not read from the reference frame interpolation pixel value storage section 309 if the initial value is stored therein.

Furthermore, information (for example, information showing that interpolation processing is already completed for 1/2 pixel positions) showing the position of pixels which have already completed the interpolation processing is written in the reference frame interpolation processing state storage section 311.

Figure 16:
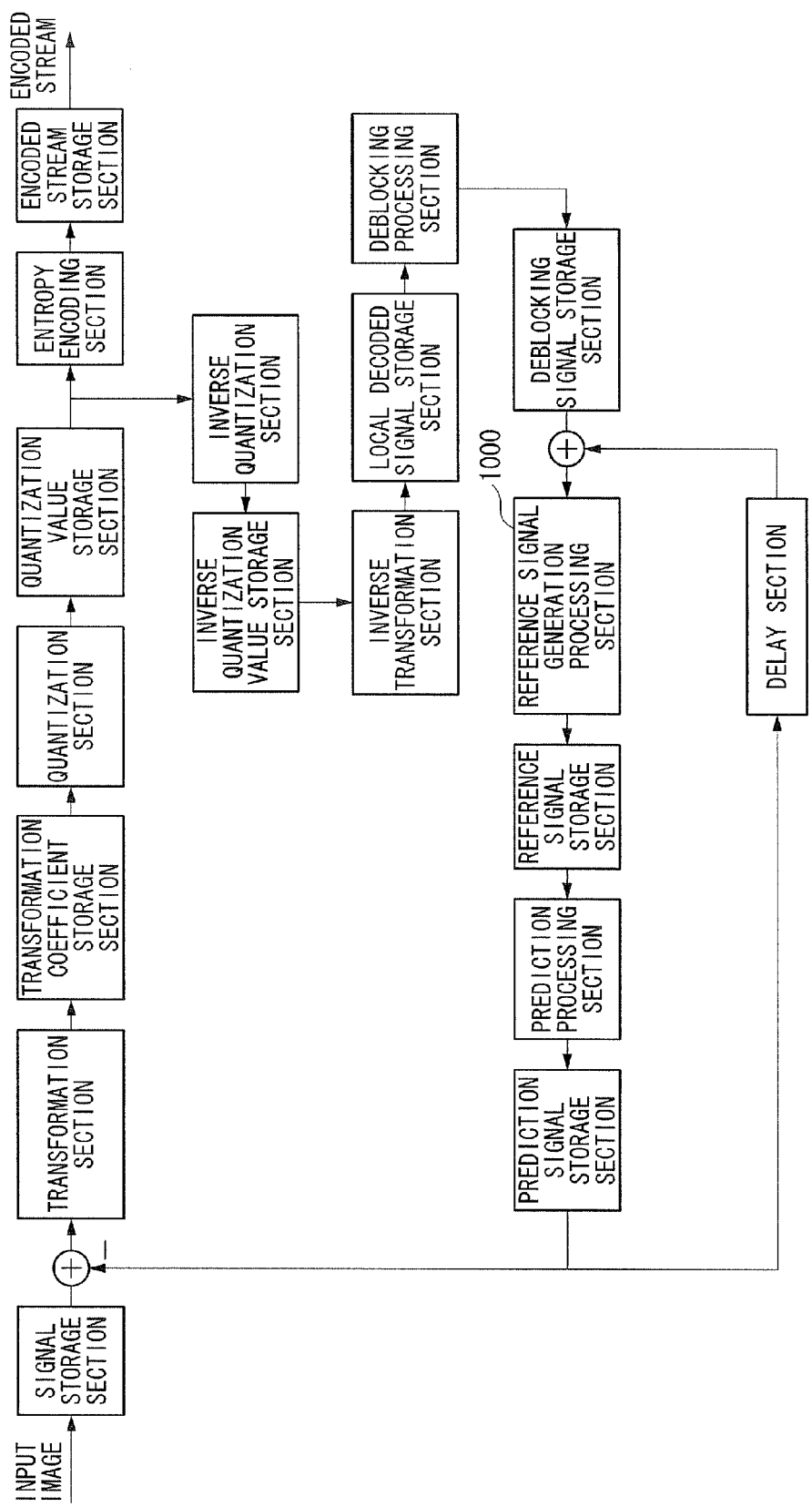
FIG. 16 is a diagram showing an example of the apparatus structure of a video encoding apparatus.
Figure 17:
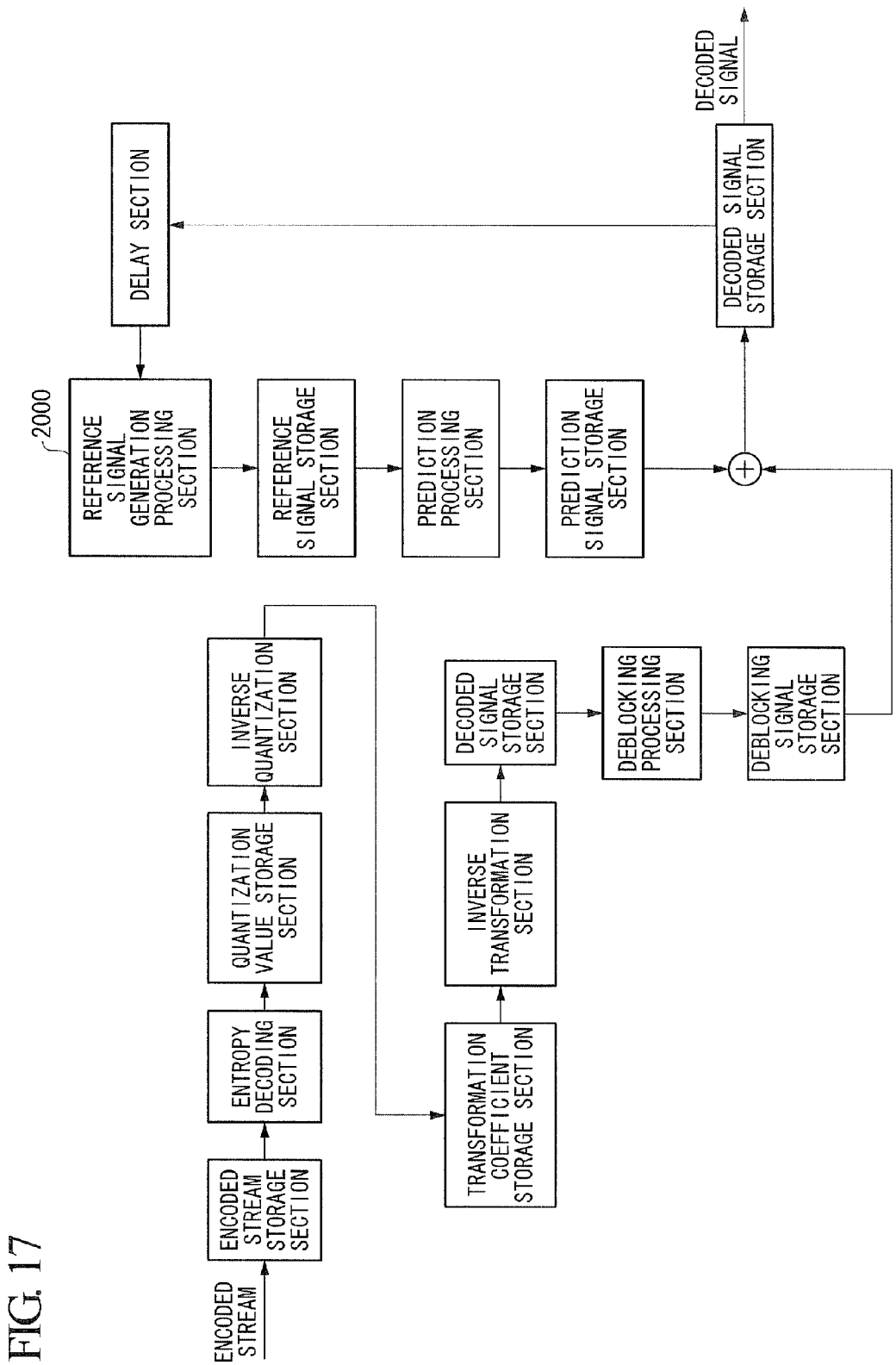
FIG. 17 is a diagram showing an example of the apparatus structure of a video decoding apparatus.

In this manner, the reference frame interpolation image generation apparatus of the present invention which is shown in FIG. 15 performs processing such that when a structure in which downsampling ratios are changed adaptively in units of frames is employed in a video encoding apparatus which employs a structure such as that shown in FIG. 16 or in a video decoding apparatus which employs a structure such as that shown in FIG. 17, an interpolated image of a reference frame which enables the required motion compensation to be achieved is generated in accordance with the interpolation accuracy of the reference frame which changes depending on the structure thereof.

Figure 18:
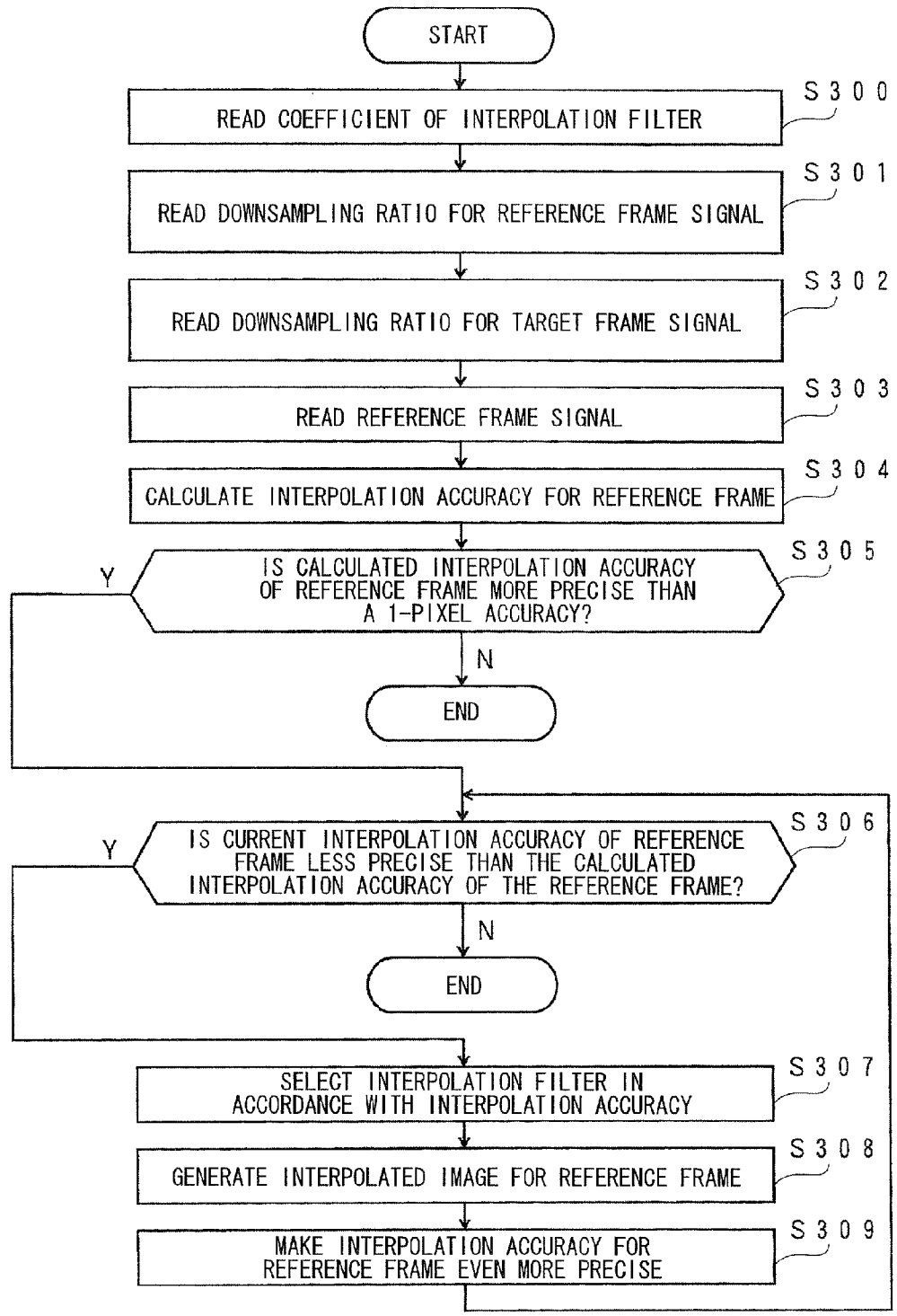
FIG. 18 is an embodiment of a flowchart showing reference frame interpolation image generation processing of the present invention.

FIG. 18 shows an embodiment of a flowchart executed by a reference frame interpolation image generation apparatus which employs the apparatus structure shown in FIG. 15. A description of the processing executed by this reference frame interpolation image generation apparatus will now be described in accordance with this flowchart.

Step S300: BR>F An interpolation filter coefficient for a reference frame in motion compensation is read as an input, and written in the register. Note that in the present invention, it is possible to use a plurality of types of filter coefficient.

Step S301: A downsampling ratio for the reference frame in motion compensation is read as an input, and written in the register.

Step S302: A downsampling ratio for the target frame in motion compensation is read as an input, and written in the register.

Step S303: A reference frame signal in motion compensation is read as an input, and written in the register.

Step S304: Using the downsampling ratio for the reference frame and the downsampling ratio for the target frame as inputs, processing is performed in order to calculate the interpolation accuracy required in the reference frame, and this is written in the register. The specific calculation method used corresponds to Formula (1).

Step S305: Using the interpolation accuracy for the reference frame calculated in step S304 as an input, determination processing is performed in order to determine whether or not the value is less than one pixel, and either a true or false value is output. If the output is a true value, the routine moves to the processing of step S306, while if the output is a false value, processing is ended as it is not necessary for interpolation to be performed.

Step S306: Using the current interpolation accuracy of the reference frame and the interpolation accuracy for the reference frame calculated in step S304 as inputs, determination processing is performed in order to determine whether or not the current interpolation accuracy of the reference frame is less precise than the interpolation accuracy of the reference frame calculated in step S304, and a true or false value is then output. If the output is a true value, the routine moves to the processing of step S307, while if the output is a false value, processing is ended.

Step S307: Using the current interpolation accuracy of the reference frame as an input, an interpolation filter coefficient of this accuracy is selected, and this filter coefficient is written in the register.

The specific filter coefficient (which is stored in the interpolation filter coefficient storage section 300 or 301) is supplied from an externally provided mechanism which determines filter coefficients.

Step S308: Using the reference frame signal, the current interpolation accuracy of the reference frame, and the interpolation filter coefficient of this accuracy which was selected in step S307 as inputs, interpolation processing is performed and an interpolated image of the reference frame is generated.

Step S309: Using the interpolation accuracy of the reference frame from step S308 as an input, this interpolation accuracy is made even more precise.

These levels of interpolation accuracy are as follows: if, for example, an interpolated image for a 1/8 pixel accuracy is desired, then by sequentially making the filter coefficient of the interpolation accuracy more and more precise, interpolated images are generated at positions corresponding in sequence to 1/2, 1/4, and 1/8 pixel accuracies.

In this manner, as a result of the reference frame interpolation image generation apparatus shown in FIG. 15 executing the reference frame interpolation image generation processing of the flowchart shown in FIG. 18, then when a structure is employed in which the downsampling ratio is changed adaptively in units of frames, even if the interpolation accuracy of the reference frame changes in accordance with a structure thereof, the processing makes it possible to generate an interpolated image of the reference frame which achieves the required motion compensation.

INDUSTRIAL APPLICABILITY

The present invention is able to be applied when a video signal made up of two or more signal elements is targeted for encoding. When a video image is being encoded, it is possible to adaptively change the downsampling ratio of a specific signal element, so that, as a result, it is possible to achieve an efficient reduction in the code amount in accordance with the visual sensitivity.

The invention claimed is:

1. A video encoding method in which a video signal made up of two or more signal elements is targeted for encoding, comprising:
    a step of setting a downsampling ratio for a specific signal element of a frame in accordance with a size of an amount of transition within the frame by storing the downsampling ratio in a memory of a video encoding apparatus;
    a step of generating a video signal which is targeted for encoding by using said video encoding apparatus to downsample the specific signal element inside the frame in accordance with the set downsampling ratio stored in said memory;
    a step of appending information showing whether or not each block of a specific size includes a significant coefficient to each block for each signal element quantized by said step of generating the video signal targeted for encoding; and
    a step of setting position information showing the position of a group of blocks which includes the specific signal element within a set of groups of blocks which share the specific signal element, for each set of groups of blocks.

2. The video encoding method according to claim 1, wherein
    the step of setting the downsampling ratio comprises:
    using said video encoding apparatus to perform a step of dividing the frame into partial areas in accordance with localized characteristics within the frame; and
    using said video encoding apparatus to perform a step of setting downsampling ratios for specific signal elements in the partial areas in accordance with the characteristics in the respective partial areas, and
    generating a video signal targeted for encoding by downsampling the specific signal elements of the partial areas in accordance with the set downsampling ratios using said video encoding apparatus.

3. A video decoding method for decoding encoded data of a video signal generated by the video encoding method according to claim 1, comprising:
    using a video decoding apparatus to perform a step of determining as to whether or not a group of blocks targeted for decoding is a group of blocks which includes the specific signal element by decoding encoded data of the position information showing at which position the group of blocks which includes the specific signal element is located; and
    using the video decoding apparatus to perform a step of, for the group of blocks which has been determined in the determination step to be a group of blocks which includes the specific signal element, decoding a downsampled signal element in accordance with a downsampling ratio set on an encoding side by decoding encoded data of the specific signal element included in the group of blocks.

4. A non-transitory video decoding program which is used to execute on a computer processing which is used to implement the video decoding method according to claim 3.

5. A non-transitory computer-readable recording medium on which is recorded a video decoding program which is used to execute on a computer processing which is used to implement the video decoding method according to claim 3.

6. A non-transitory video encoding program which is used to execute on a computer processing which is used to implement the video encoding method according to claim 1.

7. A non-transitory computer-readable recording medium on which is recorded a video encoding program which is used to execute on a computer processing which is used to implement the video encoding method according to claim 1.

8. A video encoding method in which a video signal made up of two or more signal elements is targeted for encoding, comprising:

a step of setting a downsampling ratio for a specific signal element of a frame in accordance with characteristics inside the frame by storing the downsampling ratio in a memory of a video encoding apparatus;

a step of generating a video signal which is targeted for encoding by using said video encoding apparatus to downsample the specific signal element inside the frame in accordance with the set downsampling ratio stored in said memory;

a step of, using the video encoding apparatus to test when motion compensation having a decimal fraction pixel accuracy is used for an inter-frame prediction in the encoding of the video signal targeted for encoding, using the video encoding apparatus to change the interpolation accuracy of a downsampled signal element in a reference frame in accordance with a ratio between the downsampling ratio of the frame targeted for encoding and the downsampling ratio of the reference frame; and a step of using the video encoding apparatus to generate an interpolated image of the reference frame based on the changed interpolation accuracy.

9. A video encoding method in which a video signal made up of two or more signal elements is targeted for encoding, comprising:

a step of setting a downsampling ratio for a specific signal element of a frame in accordance with characteristics inside the frame by storing the downsampling ratio in a memory of a video encoding apparatus; and a step of generating a video signal which is targeted for encoding by using said video encoding apparatus to downsample the specific signal element inside the frame in accordance with the set downsampling ratio stored in said memory, wherein the step of setting the downsampling ratio further comprises:

using the video encoding apparatus to divide the frame into partial areas in accordance with localized characteristics within the frame; and using the video encoding apparatus to set downsampling ratios for specific signal elements in the partial areas in accordance with the characteristics in the respective partial areas, and wherein the step of generating the video signal generates the video signal targeted for encoding by downsampling the specific signal elements of the partial areas in accordance with the set downsampling ratios, and the video encoding method further comprises:

using the video encoding apparatus to perform a step of, when motion compensation having a decimal fraction pixel accuracy is used for an inter-frame prediction in the encoding of the video signal targeted for encoding, the interpolation accuracy of a downsampled signal element in a partial area within the reference frame is changed in accordance with a ratio between a downsampling ratio of each of the partial areas within the frame targeted for encoding and a downsampling ratio of a partial area within a reference frame which is referred to when each of the partial areas undergoes motion compensation; and using the video encoding apparatus to perform a step of generating an interpolated image of the partial area within the reference frame based on the changed interpolation accuracy.

10. A video decoding method comprising:

using a video decoding apparatus to perform a step of, when motion compensation having a decimal fraction pixel accuracy is used for an inter-frame prediction in decoding of encoded data of a video signal targeted for encoding which is made up of two or more signal elements and is generated by downsampling a specific signal element inside a frame based on a downsampling ratio that is set in accordance with characteristics inside the frame, changing the interpolation accuracy of a downsampled signal element in a reference frame in accordance with a ratio between a downsampling ratio of a frame targeted for decoding and a downsampling ratio of the reference frame; and using the video decoding apparatus to perform a step of generating an interpolated image of the reference frame based on the changed interpolation accuracy.

11. A non-transitory video decoding program which is used to execute on a computer processing which is used to implement the video decoding method according to claim 10.

12. A non-transitory computer-readable recording medium on which is recorded a video decoding program which is used to execute on a computer processing which is used to implement the video decoding method according to claim 10.

13. A video decoding method comprising:

using a video decoding apparatus to perform a step of, when motion compensation having a decimal fraction pixel accuracy is used for an inter-frame prediction in decoding of encoded data of a video signal targeted for encoding which is made up of two or more signal elements and is generated by downsampling specific signal elements of partial areas of a frame that are divided in accordance with localized characteristics inside the frame based on downsampling ratios that are set in accordance with characteristics in the respective partial areas, changing the interpolation accuracy of a downsampled signal element in a partial area within a reference frame in accordance with a ratio between a downsampling ratio of each of the partial areas within a frame targeted for decoding and a downsampling ratio of a partial area within the reference frame which is referred to when each of the partial areas undergoes motion compensation; and using the video decoding apparatus to perform a step of generating an interpolated image of the partial area within the reference frame based on the changed interpolation accuracy.

14. A non-transitory video decoding program which is used to execute on a computer processing which is used to implement the video decoding method according to claim 13.

15. A non-transitory computer-readable recording medium on which is recorded a video decoding program which is used to execute on a computer processing which is used to implement the video decoding method according to claim 13.

16. A video encoding apparatus which targets for encoding a video signal made up of two or more signal elements, comprising:

a device which sets a downsampling ratio for a specific signal element of a frame in accordance with a size of an amount of transition within the frame;

a device which generates a video signal which is targeted for encoding by downsampling the specific signal element inside the frame in accordance with the set downsampling ratio; and a device which, when information showing whether or not each block of a specific size includes a significant coefficient is appended to each block for each quantized signal element obtained by encoding the video signal targeted for encoding, sets position information showing the position of a group of blocks which includes the specific signal element within a set of groups of blocks which share the specific signal element, for each set of groups of blocks.

17. The video encoding apparatus according to claim 16, wherein the device which sets the downsampling ratio comprises:

a device which divides the frame into partial areas in accordance with localized characteristics within the frame; and a device which sets downsampling ratios for specific signal elements in the partial areas in accordance with the characteristics in the respective partial areas, and the video signal targeted for encoding is generated by downsampling the specific signal elements of the partial areas in accordance with the set downsampling ratios.

18. A video decoding apparatus which decodes encoded data of a video signal generated by the video encoding apparatus according to claim 16, comprising:

a device which determines as to whether or not a group of blocks targeted for decoding is a group of blocks which includes the specific signal element by decoding encoded data of the position information showing at which position the group of blocks which includes the specific signal element is located; and a device which, for the group of blocks which the determination device has determined to be a group of blocks which includes the specific signal element, decodes a downsampled signal element in accordance with a downsampling ratio set on an encoding side by decoding encoded data of the specific signal element included in the group of blocks.

19. A video encoding apparatus which targets for encoding a video signal made up of two or more signal elements, comprising:

a device which sets a downsampling ratio for a specific signal element of a frame in accordance with the characteristics inside the frame;

a device which generates a video signal which is targeted for encoding by downsampling the specific signal element inside the frame in accordance with the set downsampling ratio;

a device which, when motion compensation having a decimal fraction pixel accuracy is used for an inter-frame prediction in the encoding of the video signal targeted for encoding, changes the interpolation accuracy of a downsampled signal element in a reference frame in accordance with a ratio between the downsampling ratio of the frame targeted for encoding and the downsampling ratio of the reference frame; and a device which generates an interpolated image of the reference frame based on the changed interpolation accuracy.

20. A video encoding apparatus which targets for encoding a video signal made up of two or more signal elements, comprising:

a device which sets a downsampling ratio for a specific signal element of a frame in accordance with the characteristics inside the frame; and a device which generates a video signal which is targeted for encoding by downsampling the specific signal element inside the frame in accordance with the set downsampling ratio, wherein the device which sets the downsampling ratio comprises:

a device which divides the frame into partial areas in accordance with localized characteristics within the frame; and a device which sets downsampling ratios for specific signal elements in the partial areas in accordance with the characteristics in the respective partial areas, and the video signal targeted for encoding is generated by downsampling the specific signal elements of the partial areas in accordance with the set downsampling ratios, and the video encoding apparatus further comprises:

a device which, when motion compensation having a decimal fraction pixel accuracy is used for an inter-frame prediction in the encoding of the video signal targeted for encoding, changes the interpolation accuracy of a downsampled signal element in a partial area within the reference frame in accordance with a ratio between a downsampling ratio of each of the partial areas within the frame targeted for encoding and a downsampling ratio of a partial area within a reference frame which is referred to when each of the partial areas undergoes motion compensation; and a device which generates an interpolated image of the partial area within the reference frame based on the changed interpolation accuracy.

21. A video decoding apparatus comprising:

a device which, when motion compensation having a decimal fraction pixel accuracy is used for an inter-frame prediction in decoding of encoded data of a video signal targeted for encoding which is made up of two or more signal elements and is generated by downsampling a specific signal element inside a frame based on a downsampling ratio that is set in accordance with characteristics inside the frame, changes the interpolation accuracy of a downsampled signal element in a reference frame in accordance with a ratio between a downsampling ratio of a frame targeted for decoding and a downsampling ratio of the reference frame; and a device which generates an interpolated image of the reference frame based on the changed interpolation accuracy.

22. A video decoding apparatus comprising:

a device which, when motion compensation having a decimal fraction pixel accuracy is used for an inter-frame prediction in decoding of encoded data of a video signal targeted for encoding which is made up of two or more signal elements and is generated by downsampling specific signal elements of partial areas of a frame that are divided in accordance with localized characteristics within the frame based on downsampling ratios that are set in accordance with characteristics in the respective partial areas, changes the interpolation accuracy of a downsampled signal element in a partial area within a reference frame in accordance with a ratio between a downsampling ratio of each of the partial areas within a frame targeted for decoding and a downsampling ratio of a partial area within the reference frame which is referred to when each of the partial areas undergoes motion compensation; and a device which generates an interpolated image of the partial area within the reference frame based on the changed interpolation accuracy.

* * * * *